US012760126B2

(12) United States Patent
Hiromoto et al.

(10) Patent No.: US 12,760,126 B2
(45) Date of Patent: Oct. 13, 2026

(54) BIODEGRADABLE AND/OR COMPOSTABLE COMPOSITIONS FROM BLENDS OF BIO-BASED STARCH MIXED ESTERS AND BIODEGRADABLE AND/OR COMPOSTABLE POLYMERS AND METHODS FOR MAKING THE SAME

(71) Applicant: EVERCORN, INC., Champaign, IL (US)

(72) Inventors: Yuma Hiromoto, Handa (JP); Yuri Sakakibara, Handa (JP); Erika Kurachi, Tokyo (JP)

(73) Assignee: Evercorn, Inc., Champaign, IL (US)

( * ) Notice: Subject to any disclaimer, the term of this patent is extended or adjusted under 35 U.S.C. 154(b) by 584 days.

(21) Appl. No.: 18/227,665

(22) Filed: Jul. 28, 2023

(65) Prior Publication Data

US 2024/0043660 A1 Feb. 8, 2024

Related U.S. Application Data

(60) Provisional application No. 63/393,509, filed on Jul. 29, 2022, provisional application No. 63/393,515, filed on Jul. 29, 2022, provisional application No. 63/393,506, filed on Jul. 29, 2022.

(51) Int. Cl.
*C08B 31/04* (2006.01)
*C08L 3/06* (2006.01)
*C08L 67/04* (2006.01)

(52) U.S. Cl.
CPC ................ *C08B 31/04* (2013.01); *C08L 3/06* (2013.01); *C08L 67/04* (2013.01); *C08L 2201/06* (2013.01)

(58) Field of Classification Search
None
See application file for complete search history.

(56) References Cited

U.S. PATENT DOCUMENTS 904,562 A 11/1908 Rathbun
4,891,404 A 1/1990 Narayan et al.
5,205,863 A 4/1993 Elion
5,234,977 A 8/1993 Bastioli et al.
5,292,782 A 3/1994 Bastioli et al.
5,367,067 A 11/1994 Frische et al.
5,397,834 A 3/1995 Jane et al.
5,412,005 A 5/1995 Bastioli et al.
5,430,140 A 7/1995 Frische et al.
5,444,107 A 8/1995 Ajioka et al.
5,459,258 A 10/1995 Merrill et al.
5,462,983 A 10/1995 Bloembergen et al.
5,490,634 A 2/1996 Jain et al.
5,498,224 A 3/1996 Kauffman et al.
5,500,465 A 3/1996 Krishnan et al.
5,516,815 A 5/1996 Buehler et al.
5,554,660 A 9/1996 Altieri et al.
5,571,887 A 11/1996 Li et al.
5,587,412 A 12/1996 Borchers et al.
5,605,577 A 2/1997 Rayas et al.
5,616,671 A 4/1997 Narayan et al.
5,629,416 A 5/1997 Neigel et al.
5,654,353 A 8/1997 Li et al.
5,693,786 A 12/1997 Tanaka et al.
5,703,226 A 12/1997 Nickel et al.
5,710,269 A 1/1998 Feuer
5,711,908 A 1/1998 Tiefenbacher et al.
5,714,540 A 2/1998 Tanaka et al.
5,714,601 A 2/1998 Tanaka et al.
5,719,214 A 2/1998 Tanaka et al.
5,728,824 A 3/1998 Narayan et al.
5,789,570 A 8/1998 Buchholz et al.
5,854,345 A 12/1998 Xu et al.
5,861,461 A 1/1999 Lee et al.
5,869,647 A 2/1999 Narayan et al.
5,936,014 A 8/1999 Voigt et al.
5,956,463 A 9/1999 Patrick et al.
5,969,089 A 10/1999 Narayan et al.
5,993,530 A 11/1999 Tanaka et al.
6,011,092 A 1/2000 Seppälä et al.
6,045,868 A 4/2000 Rayas et al.
6,054,510 A 4/2000 Willett et al.
6,063,914 A 5/2000 Wolf et al.
6,242,593 B1 6/2001 Bloembergen et al.
(Continued)

FOREIGN PATENT DOCUMENTS

CN 1420139 A 5/2003
CN 1583797 A 2/2005
(Continued)

OTHER PUBLICATIONS

Notification Concerning Transmittal of International Preliminary Report on Patentability and International Preliminary Report on Patentability issued in PCT/US2023/028951 (Feb. 13, 2025).
Notification Concerning Transmittal of International Preliminary Report on Patentability and International Preliminary Report on Patentability issued in PCT/US2023/028952 (Feb. 13, 2025).
Notification Concerning Transmittal of International Preliminary Report on Patentability and International Preliminary Report on Patentability issued in PCT/US2023/028953 (Feb. 13, 2025).
Rivard, C.; et al. "Starch esters as biodegradable plastics: Effects of ester group chain length and degree of substitution on anaerobic biodegradation" Enzyme and Microbial Technology 1995, vol. 17, pp. 848-852. (Year: 1995).
Aburto, J.; et al. "Synthesis, Characterization, and Biodegradability of Fatty-Acid Esters of Amylose and Starch", Journal of Applied Polymer Science 1999, vol. 74, pp. 1440-1451. (Year: 1999).
(Continued)

*Primary Examiner* — Christopher M Rodd
(74) *Attorney, Agent, or Firm* — Barnes & Thornburg LLP; G. Peter Nichols

(57) ABSTRACT

Biodegradable and/or compostable compositions of blends of bio-based starch mixed esters and biodegradable and/or compostable polymers and methods of making them are described. The blend may include from about 20% to about 90% of the described starch mixed esters and from about 10% to about 80% of at least one other biodegradable and/or compostable polymer other than the bio-based starch mixed ester.

15 Claims, 15 Drawing Sheets

(56) References Cited

U.S. PATENT DOCUMENTS

| | | | |
|---|---|---|---|
| 6,406,649 B1 | 6/2002 | Fisk | |
| 6,462,120 B2 | 10/2002 | Offerman | |
| 6,506,824 B1 | 1/2003 | Bastioli et al. | |
| 6,605,715 B1 | 8/2003 | Lammers et al. | |
| 6,617,449 B2 | 9/2003 | Tanaka | |
| 6,656,984 B1 | 12/2003 | Haasmaa et al. | |
| RE38,425 E | 2/2004 | Dimmock et al. | |
| 6,723,802 B2 | 4/2004 | Drzal et al. | |
| 6,730,724 B1 | 5/2004 | Bastioli et al. | |
| 6,818,686 B1 | 11/2004 | Colpaert et al. | |
| 6,833,097 B2 | 12/2004 | Miyachi | |
| 7,135,429 B2 | 11/2006 | Raman et al. | |
| 7,153,354 B2 | 12/2006 | Narayan et al. | |
| 7,253,221 B2 | 8/2007 | Mohanty et al. | |
| 7,354,656 B2 | 4/2008 | Mohanty et al. | |
| 7,361,727 B2 | 4/2008 | Narayan et al. | |
| 7,384,993 B2 | 6/2008 | Yu et al. | |
| 7,517,924 B1 | 4/2009 | Rimsa et al. | |
| 7,553,919 B2 | 6/2009 | Narayan et al. | |
| 7,569,107 B2 | 8/2009 | Boyer et al. | |
| 7,569,556 B2 | 8/2009 | Narayan et al. | |
| 7,576,147 B2 | 8/2009 | Drzal et al. | |
| 7,579,413 B2 | 8/2009 | Mohanty et al. | |
| 7,601,677 B2 | 10/2009 | Graiver et al. | |
| 7,629,405 B2 | 12/2009 | Narayan et al. | |
| 7,732,523 B2 | 6/2010 | Morimoto et al. | |
| 7,879,440 B2 | 2/2011 | Yatsuzuka et al. | |
| 7,931,949 B2 | 4/2011 | Kim et al. | |
| 7,985,794 B2 | 7/2011 | Narayan et al. | |
| 8,008,373 B2 | 8/2011 | Narayan et al. | |
| 8,080,596 B2 | 12/2011 | Wu et al. | |
| 8,110,036 B2 | 2/2012 | Narayan et al. | |
| 8,217,193 B2 | 7/2012 | Narayan et al. | |
| 8,349,032 B2 | 1/2013 | Narayan et al. | |
| 8,481,653 B2 | 7/2013 | Bastioli et al. | |
| 8,597,422 B2 | 12/2013 | Peltonen et al. | |
| 8,598,404 B2 | 12/2013 | Wang et al. | |
| 8,728,617 B2 | 5/2014 | Benenati et al. | |
| 8,759,279 B2 | 6/2014 | Funk et al. | |
| 8,900,667 B2 | 12/2014 | Boggs et al. | |
| 9,000,103 B2 | 4/2015 | Narayan et al. | |
| 9,056,967 B2 | 6/2015 | Wang et al. | |
| 9,088,660 B2 | 7/2015 | Goldfarb et al. | |
| 9,273,180 B2 | 3/2016 | Narayan et al. | |
| 9,499,671 B2 | 11/2016 | Narayan et al. | |
| 9,770,053 B2 | 9/2017 | Sebastian | |
| 9,790,350 B2 | 10/2017 | Netravali et al. | |
| 10,259,768 B2 | 4/2019 | Auras et al. | |
| 10,561,082 B2 | 2/2020 | Smucker | |
| 11,116,209 B2 | 9/2021 | Wise et al. | |
| 11,155,732 B2 | 10/2021 | Rabnawaz et al. | |
| 11,203,648 B2 | 12/2021 | Itoh | |
| 2001/0037018 A1 | 11/2001 | Kakuschke et al. | |
| 2003/0109698 A1* | 6/2003 | Tanaka | C08L 3/06 536/107 |
| 2005/0215672 A1 | 9/2005 | Mohanty et al. | |
| 2007/0073051 A1 | 3/2007 | Myllymaki et al. | |
| 2007/0135536 A1 | 6/2007 | Mohanty et al. | |
| 2007/0287795 A1 | 12/2007 | Huda et al. | |
| 2010/0076099 A1 | 3/2010 | Mohanty et al. | |
| 2010/0236969 A1 | 9/2010 | Auras et al. | |
| 2011/0077313 A1 | 3/2011 | Takahashi et al. | |
| 2012/0009387 A1 | 1/2012 | Wang et al. | |
| 2012/0016328 A1 | 1/2012 | Shi et al. | |
| 2012/0172587 A1 | 7/2012 | Volkert et al. | |
| 2013/0023674 A1 | 1/2013 | Narayan et al. | |
| 2014/0079935 A1 | 3/2014 | Broyles | |
| 2014/0093632 A1 | 4/2014 | Sakakibara et al. | |
| 2014/0199557 A1 | 7/2014 | Naito et al. | |
| 2016/0017091 A1 | 1/2016 | Wolff et al. | |
| 2018/0338495 A1 | 11/2018 | Raman et al. | |
| 2019/0010251 A1 | 1/2019 | Tanaka et al. | |
| 2021/0155777 A1 | 5/2021 | Hart-Cooper et al. | |
| 2021/0246333 A1 | 8/2021 | Rabnawaz et al. | |
| 2021/0355245 A1 | 11/2021 | Wang et al. | |
| 2022/0041776 A1 | 2/2022 | Wenzel et al. | |

FOREIGN PATENT DOCUMENTS

| | | |
|---|---|---|
| CN | 1583851 A | 2/2005 |
| CN | 1706883 A | 12/2005 |
| CN | 1931908 A | 3/2007 |
| CN | 1935885 A | 3/2007 |
| CN | 1308384 C | 4/2007 |
| CN | 101274975 A | 10/2008 |
| CN | 101469042 A | 7/2009 |
| CN | 101469043 A | 7/2009 |
| CN | 101469048 A | 7/2009 |
| CN | 101476244 A | 7/2009 |
| CN | 101337994 B | 7/2010 |
| CN | 101230252 B | 9/2010 |
| CN | 102020838 A | 4/2011 |
| CN | 1931906 B | 7/2011 |
| CN | 101200393 B | 1/2012 |
| CN | 101721965 B | 1/2012 |
| CN | 101602884 B | 2/2012 |
| CN | 102391631 A | 3/2012 |
| CN | 101747605 B | 4/2012 |
| CN | 101597388 B | 7/2012 |
| CN | 102587137 A | 7/2012 |
| CN | 102603904 A | 7/2012 |
| CN | 102311630 B | 8/2012 |
| CN | 101805464 B | 10/2012 |
| CN | 101942120 B | 12/2012 |
| CN | 102816250 A | 12/2012 |
| CN | 102241782 B | 1/2013 |
| CN | 102898794 A | 1/2013 |
| CN | 102977565 A | 3/2013 |
| CN | 102993655 A | 3/2013 |
| CN | 103122079 A | 5/2013 |
| CN | 1931907 B | 6/2013 |
| CN | 102399841 B | 7/2013 |
| CN | 103304851 A | 9/2013 |
| CN | 102732582 B | 10/2013 |
| CN | 103739863 A | 4/2014 |
| CN | 103074012 B | 8/2014 |
| CN | 102952292 B | 9/2014 |
| CN | 104311679 A | 1/2015 |
| CN | 104562768 A | 4/2015 |
| CN | 103194240 B | 5/2015 |
| CN | 104725805 A | 6/2015 |
| CN | 103570838 B | 9/2015 |
| CN | 103641922 B | 9/2015 |
| CN | 104892779 A | 9/2015 |
| CN | 104893008 A | 9/2015 |
| CN | 103242786 B | 12/2015 |
| CN | 103833861 B | 12/2015 |
| CN | 105153444 A | 12/2015 |
| CN | 103059148 B | 1/2016 |
| CN | 103788605 B | 2/2016 |
| CN | 104774272 B | 2/2016 |
| CN | 103756273 B | 3/2016 |
| CN | 103865107 B | 3/2016 |
| CN | 104231581 B | 3/2016 |
| CN | 105384833 A | 3/2016 |
| CN | 104088195 B | 4/2016 |
| CN | 105566691 A | 5/2016 |
| CN | 103992517 B | 6/2016 |
| CN | 104031153 B | 6/2016 |
| CN | 104231573 B | 6/2016 |
| CN | 104371290 B | 8/2016 |
| CN | 105832698 A | 8/2016 |
| CN | 105860456 A | 8/2016 |
| CN | 105884912 A | 8/2016 |
| CN | 105968421 A | 9/2016 |
| CN | 105968423 A | 9/2016 |
| CN | 106009063 A | 10/2016 |
| CN | 106117623 A | 11/2016 |
| CN | 104277125 B | 12/2016 |
| CN | 106188643 A | 12/2016 |
| CN | 106317595 A | 1/2017 |
| CN | 106366354 A | 2/2017 |

(56) References Cited

FOREIGN PATENT DOCUMENTS

| | | | |
|---|---|---|---|
| CN | 104892778 | B | 3/2017 |
| CN | 106609421 | A | 5/2017 |
| CN | 106665567 | A | 5/2017 |
| CN | 106750826 | A | 5/2017 |
| CN | 106751273 | A | 5/2017 |
| CN | 106758222 | A | 5/2017 |
| CN | 104448012 | B | 6/2017 |
| CN | 106804586 | A | 6/2017 |
| CN | 106832013 | A | 6/2017 |
| CN | 106854333 | A | 6/2017 |
| CN | 104788737 | B | 7/2017 |
| CN | 106916425 | A | 7/2017 |
| CN | 106957372 | A | 7/2017 |
| CN | 107141364 | A | 9/2017 |
| CN | 107298772 | A | 10/2017 |
| CN | 104530245 | B | 11/2017 |
| CN | 107325574 | A | 11/2017 |
| CN | 107383816 | A | 11/2017 |
| CN | 104497324 | B | 12/2017 |
| CN | 107417986 | A | 12/2017 |
| CN | 107501879 | A | 12/2017 |
| CN | 107652476 | A | 2/2018 |
| CN | 107663282 | A | 2/2018 |
| CN | 107674394 | A | 2/2018 |
| CN | 107722526 | A | 2/2018 |
| CN | 107778989 | A | 3/2018 |
| CN | 106947118 | B | 4/2018 |
| CN | 107903449 | A | 4/2018 |
| CN | 107926368 | A | 4/2018 |
| CN | 105482135 | B | 5/2018 |
| CN | 108003510 | A | 5/2018 |
| CN | 108017862 | A | 5/2018 |
| CN | 108047503 | A | 5/2018 |
| CN | 108329529 | A | 7/2018 |
| CN | 105601758 | B | 8/2018 |
| CN | 108586824 | A | 9/2018 |
| CN | 108586935 | A | 9/2018 |
| CN | 104358184 | B | 10/2018 |
| CN | 108948509 | A | 12/2018 |
| CN | 108976484 | A | 12/2018 |
| CN | 108997686 | A | 12/2018 |
| CN | 109054107 | A | 12/2018 |
| CN | 109280303 | A | 1/2019 |
| CN | 106881929 | B | 3/2019 |
| CN | 106881930 | B | 3/2019 |
| CN | 106903952 | B | 3/2019 |
| CN | 109467752 | A | 3/2019 |
| CN | 109535753 | A | 3/2019 |
| CN | 109666249 | A | 4/2019 |
| CN | 109763331 | A | 5/2019 |
| CN | 109770334 | A | 5/2019 |
| CN | 109929228 | A | 6/2019 |
| CN | 110128806 | A | 8/2019 |
| CN | 110171628 | A | 8/2019 |
| CN | 110229485 | A | 9/2019 |
| CN | 106521953 | B | 10/2019 |
| CN | 110358171 | A | 10/2019 |
| CN | 106947116 | B | 11/2019 |
| CN | 110453497 | A | 11/2019 |
| CN | 110734633 | A | 1/2020 |
| CN | 110746730 | A | 2/2020 |
| CN | 110845830 | A | 2/2020 |
| CN | 107573422 | B | 3/2020 |
| CN | 110922707 | A | 3/2020 |
| CN | 110951462 | A | 4/2020 |
| CN | 111098574 | A | 5/2020 |
| CN | 111100310 | A | 5/2020 |
| CN | 111171539 | A | 5/2020 |
| CN | 111303571 | A | 6/2020 |
| CN | 111335037 | A | 6/2020 |
| CN | 111423707 | A | 7/2020 |
| CN | 107522933 | B | 8/2020 |
| CN | 111548616 | A | 8/2020 |
| CN | 111607205 | A | 9/2020 |
| CN | 111647258 | A | 9/2020 |
| CN | 111675816 | A | 9/2020 |
| CN | 111793332 | A | 10/2020 |
| CN | 109535677 | B | 11/2020 |
| CN | 112063022 | A | 12/2020 |
| CN | 108130158 | B | 1/2021 |
| CN | 109135203 | B | 1/2021 |
| CN | 110386989 | B | 2/2021 |
| CN | 112358658 | A | 2/2021 |
| CN | 112625409 | A | 4/2021 |
| CN | 112724624 | A | 4/2021 |
| CN | 110330571 | B | 6/2021 |
| CN | 110511544 | B | 6/2021 |
| CN | 112898746 | A | 6/2021 |
| CN | 112898990 | A | 6/2021 |
| CN | 109320662 | B | 7/2021 |
| CN | 109912889 | B | 7/2021 |
| CN | 113201209 | A | 8/2021 |
| CN | 113321908 | A | 8/2021 |
| CN | 111825967 | B | 9/2021 |
| CN | 113416265 | A | 9/2021 |
| CN | 113667190 | A | 11/2021 |
| CN | 110128801 | B | 12/2021 |
| CN | 113861712 | A | 12/2021 |
| CN | 113715242 | B | 2/2022 |
| CN | 113997670 | A | 2/2022 |
| CN | 114013148 | A | 2/2022 |
| CN | 114058168 | A | 2/2022 |
| CN | 112876745 | B | 3/2022 |
| CN | 114106526 | A | 3/2022 |
| CN | 114106538 | A | 3/2022 |
| CN | 114148058 | A | 3/2022 |
| DE | 4418677 | A1 | 11/1995 |
| DE | 4423681 | A1 | 1/1996 |
| DE | 4424415 | A1 | 1/1996 |
| DE | 4425688 | A1 | 1/1996 |
| DE | 4436924 | A1 | 4/1996 |
| DE | 4443539 | A1 | 6/1996 |
| DE | 19515477 | A1 | 10/1996 |
| DE | 19517207 | A1 | 11/1996 |
| DE | 19519495 | A1 | 11/1996 |
| DE | 19607485 | A | 9/1997 |
| DE | 9219143 | U1 | 10/1998 |
| DE | 19827312 | A1 | 12/1999 |
| DE | 19830774 | A1 | 1/2000 |
| DE | 19830775 | A1 | 1/2000 |
| DE | 19841382 | A1 | 3/2000 |
| DE | 19856507 | A1 | 6/2000 |
| DE | 19924772 | A1 | 11/2000 |
| DE | 10010912 | A1 | 9/2001 |
| EP | 0711325 | | 5/1996 |
| EP | 0714913 | A1 | 6/1996 |
| EP | 0741006 | A1 | 11/1996 |
| EP | 0799245 | A1 | 10/1997 |
| EP | 0491813 | B1 | 12/1998 |
| EP | 0817804 | B1 | 10/2000 |
| EP | 1070086 | A1 | 1/2001 |
| EP | 0638609 | B1 | 3/2001 |
| EP | 1142911 | | 10/2001 |
| EP | 0814092 | B1 | 11/2001 |
| EP | 1447415 | | 8/2004 |
| EP | 0837903 | B1 | 12/2004 |
| EP | 1153078 | B1 | 8/2005 |
| EP | 1113022 | B1 | 3/2006 |
| FR | 2732687 | A1 | 10/1996 |
| FR | 2816310 | A1 | 5/2002 |
| GB | 1485833 | A | 9/1977 |
| JP | H05125101 | A | 5/1993 |
| JP | H06136168 | A | 5/1994 |
| JP | H0892313 | A | 4/1996 |
| JP | H0931103 | A | 2/1997 |
| JP | 2740824 | B2 | 4/1998 |
| JP | H1094592 | A | 4/1998 |
| JP | H10101465 | A | 4/1998 |
| JP | H10101501 | A | 4/1998 |
| JP | 2000053534 | A | 2/2000 |
| JP | 2000109665 | A | 4/2000 |
| JP | 3350497 | B2 | 11/2002 |
| JP | 2003096101 | A | 4/2003 |
| JP | 2003116371 | A | 4/2003 |

(56) References Cited

FOREIGN PATENT DOCUMENTS

| | | | |
|---|---|---|---|
| JP | 2004059812 | A | 2/2004 |
| JP | 2004149636 | A | 5/2004 |
| JP | 2004189770 | A | 7/2004 |
| JP | 2004262217 | A | 9/2004 |
| JP | 2005162876 | A | 6/2005 |
| JP | 2006299101 | A | 11/2006 |
| JP | 2007002142 | A | 1/2007 |
| JP | 2007224115 | A | 9/2007 |
| JP | 4190261 | B2 | 12/2008 |
| JP | 2009238411 | A | 10/2009 |
| JP | 4357893 | B2 | 11/2009 |
| JP | 2009265251 | A | 11/2009 |
| JP | 4646355 | B2 | 3/2011 |
| JP | 4836568 | B2 | 12/2011 |
| JP | 4958386 | B2 | 6/2012 |
| JP | 5073956 | B2 | 11/2012 |
| JP | 5799569 | B2 | 10/2015 |
| KR | 900006336 | B1 | 8/1990 |
| KR | 950013176 | B1 | 10/1995 |
| KR | 960006623 | B1 | 5/1996 |
| KR | 960007756 | B1 | 6/1996 |
| KR | 19980078336 | A | 11/1998 |
| KR | 100226012 | B1 | 10/1999 |
| KR | 100332163 | B1 | 4/2002 |
| KR | 20020066258 | A | 8/2002 |
| KR | 100354496 | B1 | 12/2002 |
| KR | 100368738 | B1 | 4/2003 |
| KR | 100385718 | B1 | 11/2003 |
| KR | 100420899 | B1 | 3/2004 |
| KR | 100440477 | B1 | 7/2004 |
| KR | 100537947 | B1 | 12/2005 |
| KR | 100578113 | B1 | 5/2006 |
| KR | 101202155 | B1 | 11/2012 |
| KR | 101697636 | B1 | 1/2017 |
| KR | 102054720 | B1 | 12/2019 |
| KR | 102271122 | B1 | 7/2021 |
| TH | 12565 | B | 7/1996 |
| WO | 9320141 | A1 | 10/1993 |
| WO | 9616116 | A1 | 5/1996 |
| WO | 9731979 | A1 | 9/1997 |
| WO | 9807782 | A1 | 2/1998 |
| WO | 9941287 | A1 | 8/1999 |
| WO | 2006014054 | A1 | 2/2006 |
| WO | 2006055504 | A3 | 1/2007 |
| WO | 2007100592 | A3 | 11/2007 |
| WO | 2009032199 | A1 | 3/2009 |
| WO | 2009103856 | A2 | 8/2009 |
| WO | 2009108290 | A1 | 9/2009 |
| WO | 2010144515 | A1 | 12/2010 |
| WO | 2011005408 | A1 | 1/2011 |
| WO | 2012154266 | A1 | 11/2012 |
| WO | 2016094859 | A1 | 6/2016 |
| WO | 2018082722 | A1 | 5/2018 |
| WO | 2018116541 | A1 | 6/2018 |

OTHER PUBLICATIONS

PubChem entry for Palmitic acid; accessed Nov. 25, 2025 (Year 2025).

Denko K.K., “Bionolle—Biodegradable Aliphatic Polyester”, A chemical company with individualized products, Bionolle Group, Nov. 2013, 4 pages.

Diop et al., “Effects of acetic acid/acetic anhydride ratios on the properties of corn starch acetates”, Food Chemistry, Elsevier, vol. 126, 2011, pp. 1662-1669.

Hefnawy et al., “Modification of yellow corn starch acetylation by acetic anhydride”, Plant Archives, vol. 20, Issue No. 2, 2020, pp. 9125-9132.

Peydecastaing et al., “Consecutive reactions in an oleic acid and acetic anhydride reaction medium”, OATAO, University of Toulouse, Oct. 2008, 7 pages.

Byung et al, “Preparation and physical properties of starch mixed esters,” Starch/Starke, Wiley-VCH Verlag, Weinheim, DE, vol. 60(3/4): 146-158 (Mar. 1, 2008).

Fringant et al., “Preparation of mixed esters of starch or use of an external plasticizer: two different ways to change the properties of starch acetate films,” Carbohydrate Polymers, Applied science publishers, vol. 35(1-2): 97-106 (Jan. 2, 1998).

Search Report & Written Opinion issued in PCT/US2023/028951 (Nov. 13, 2023).

Search Report & Written Opinion issued in PCT/US2023/028952 (Nov. 14, 2023).

Search Report & Written Opinion issued in PCT/US2023/028953 (Nov. 14, 2023).

* cited by examiner (2) SAS ETHANOL WASHED

TGA ANALYSES

BIODEGRADABLE AND/OR COMPOSTABLE COMPOSITIONS FROM BLENDS OF BIO-BASED STARCH MIXED ESTERS AND BIODEGRADABLE AND/OR COMPOSTABLE POLYMERS AND METHODS FOR MAKING THE SAME

This Application claims the benefit of priority to U.S. Application No. 63/393,506 filed on Jul. 29, 2022, U.S. Application No. 63/393,509 filed on Jul. 29, 2022, and U.S. Application No. 63/393,515 filed on Jul. 29, 2022, the entire contents of each of the applications are incorporated herein by reference.

This disclosure relates to biodegradable and/or compostable compositions of blends of bio-based starch mixed esters biodegradable and/or compostable compositions and biodegradable and/or compostable polymers, where the starch is provided from non-petroleum based sources, i.e., from plant or bio-based sources. The disclosure also includes methods for making the described biodegradable compositions of blends of bio-based starch mixed esters and biodegradable and/or compostable polymers.

BACKGROUND

The accumulation of plastic waste in the environment is an increasing societal concern. Different solutions and disposal routes are being explored to reduce the amount of plastic reaching the environment and landfills such as recycling, composting, and energy recovery via incineration. One approach to reduce the pollution associated with fossil-derived plastics is through the development and use of bio-based and biodegradable polymers.

To that end, polymers from bio-based starch have been investigated; yet there are currently no commercially available bio-based starch mixed ester biodegradable and/or compostable compositions.

SUMMARY

In general, this disclosure is directed to biodegradable compositions of blends of bio-based starch mixed esters and biodegradable polymers and methods of making them. The blend may include from 20% to about 90% of the described starch mixed esters and from about 10% to about 80% of at least one other biodegradable polymer. The blends may be prepared by mixing or melt processing using, for example, an extruder.

The starch mixed ester may have the following general formula:

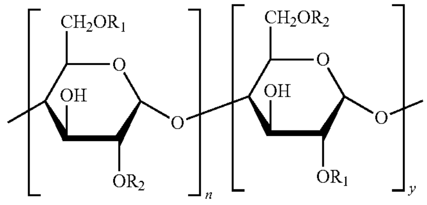

wherein n=1 to 20 and y=1 to 20; wherein $R_1$ is acetic, propionic, butyric, hexanoic, maleic, succinic, phthalic, hexenyl succinic, octenyl, and stearic anhydride and mixtures thereof and wherein $R_2$ is $C_{2-24}$ carboxylic acid, and is desirably lauric acid, myristic acid, palmitic acid, stearic acid, arachidic acid, linoleic acid, linolenic acid, steridonic acid, oleic acid, and mixtures thereof. In some instances, $R_2$ is lauric acid, stearic acid, oleic acid and mixtures thereof.

The starch mixed ester may be formed by reacting at least one anhydride, at least one acid, and a bio-based starch in the presence of a catalyst to form a starch mixed ester biodegradable and/or compostable composition. In some aspects, the at least one anhydride and at least one acid may be first reacted to form a mixed acid anhydride, which may then be reacted with a bio-based starch in the presence of a catalyst to form a starch mixed ester biodegradable and/or compostable composition. Advantageously, the reactions occur with bound and/or free water being present in the starch and/or the catalyst.

In some instances, a first mixed acid anhydride and a second mixed acid anhydride are separately formed and, after formation mixed together prior to reacting the mixture with a starch. In this regard, a first anhydride and a first acid may be reacted to form a first mixed acid anhydride, a second anhydride and a second acid may be reacted to form a second mixed acid anhydride. While the first and second anhydride may differ, generally it is the same and, in those instances, it may be acetic anhydride. Typically, the first and second acids differ. Thereafter, the first anhydride and second anhydride may be mixed together and then reacted with a starch in the presence of a catalyst to form a starch mixed ester biodegradable composition.

In other instances, a first mixed acid anhydride, a second mixed acid anhydride, and a third mixed acid anhydride are separately formed and, after formation mixed together prior to reacting the mixture with a starch. In this regard, a first anhydride and a first acid may be reacted to form a first mixed acid anhydride, a second anhydride and a second acid may be reacted to form a second mixed acid anhydride, and a third anhydride and a third acid may be reacted to form a third mixed acid anhydride. While each of the first, second, and third anhydride may differ, generally it is the same and, in those instances, it may be acetic anhydride. Typically, each of the first, second, and third acids differ. After formation of the first, second, and third mixed acid anhydride, they are mixed together and then reacted with a starch in the presence of a catalyst to form a starch mixed ester biodegradable composition.

In another embodiment, an acid is mixed with an anhydride to form an anhydride mixture. Separately, an anhydride, which may or may not be the same as that used to form the anhydride mixture, is reacted with a starch in the presence of a catalyst, which is typical a base such as a hydroxide, e.g., sodium hydroxide. The product is dehydrated and reacted with the anhydride mixture during with the starch is esterified to form a starch mixed ester biodegradable and/or compostable composition, which may be washed and dried to form the desired product.

In yet another embodiment, an acid, an acid anhydride, a catalyst, and starch may be combined in a single reactor where the starch is both dehydrated and esterified to form the starch mixed ester biodegradable and/or compostable composition.

In some instances, a first mixed acid anhydride and a second mixed acid anhydride are separately formed and, after formation mixed together prior to reacting the mixture with a starch. In this regard, a first anhydride and a first acid may be reacted to form a first mixed acid anhydride, a second anhydride and a second acid may be reacted to form a second mixed acid anhydride. While the first and second anhydride may differ, generally it is the same and, in those instances, it may be acetic anhydride. Typically, the first and second acids differ. Thereafter, the first anhydride and second anhydride may be mixed together and then reacted with a starch in the presence of a catalyst to form a starch mixed ester biodegradable and/or compostable composition.

In other instances, a first mixed acid anhydride, a second mixed acid anhydride, and a third mixed acid anhydride are separately formed and, after formation mixed together prior to reacting the mixture with a starch. In this regard, a first anhydride and a first acid may be reacted to form a first mixed acid anhydride, a second anhydride and a second acid may be reacted to form a second mixed acid anhydride, and a third anhydride and a third acid may be reacted to form a third mixed acid anhydride. While each of the first, second, and third anhydride may differ, generally it is the same and, in those instances, it may be acetic anhydride. Typically, each of the first, second, and third acids differ. After formation of the first, second, and third mixed acid anhydride, they are mixed together and then reacted with a starch in the presence of a catalyst to form a starch mixed ester biodegradable and/or compostable composition.

In still other embodiments, an acid anhydride is mixed with a starch, and a catalyst under suitable conditions and for a period of time to dehydrate the starch and any water that may be present in conjunction with the catalyst. In one instance, the acid anhydride may be acetic anhydride, the catalyst may be a 50% aqueous NaOH solution, and the starch may be provided from cornstarch which may be a high amylose cornstarch. Thereafter, an acid, which may be a $C_{2-24}$ carboxylic acid, and an additional amount of the acid anhydride are added to the reactants under suitable conditions to esterify the starch to form the starch mixed ester biodegradable and/or compostable composition. Thereafter, the resulting mixture may be water washed to remove unreacted reaction products to provide a resulting water-washed starch mixed ester product, which may be dried. It is also contemplated that the water-washed starch mixed ester product may be further washed with an alcohol such as ethanol to remove unreacted acid to provide an alcohol-washed starch mixed ester product, which may be dried. Alternatively, the dehydrated product may be directed to an extruder for further processing optionally with additives or other biodegradable and/or compostable polymers, as will be explained in more detail below. As yet another alternative, it is contemplated that the water and alcohol washed product may be dried and then blended with one or more biodegradable and/or compostable polymers.

In some instances, one or all of the starch, fatty acid, and anhydride are derived from bio-based sources, i.e., from plants rather than from petroleum sources and to that end, it is contemplated that methods of making the described starch mixed ester compositions and the resulting starch mixed ester compositions are free of petroleum sourced starch, fatty acid, and anhydride.

The resulting starch mixed ester biodegradable and/or compostable compositions (whether water-washed, alcohol-washed, or otherwise) may have any suitable physical form such as but not limited to liquid, powder, particles, resin, etc.

The biodegradable polymer in the blend is generally a starch biodegradable polymer and may include polylactide (PLA), poly(hydroxybutyrate) (PHB), polycaprolactone (PCL), polyhydroxy butyrate valerate (PHB-V), poly(β-hydroxyalkanoate) (PHA), Poly(1,4-butylene succinate) (PBS), polybutylene adipate terephthalate (PBAT), poly (vinyl alcohol) (PVA), cellulose-based ester derivatives or a mixture thereof.

The blend composition may include optional additives selected from the group consisting of extenders; fillers; wood derived materials; oxides of magnesium, aluminum, silicon, and titanium; alkali and alkaline earth metal salts; lubricants; mold release agents; acid scavengers; plasticizers; UV stabilizers; coloring agents; flame retardants; antioxidants; thermal stabilizers; and mixtures thereof.

In some aspects, it is contemplated that articles may be made from the described compositions (both the starch mixed ester compositions and the blends). To that end, the compositions can be processed by various methods known in the art such as, but not limited to, extrusion, injection molding, compression molding, filming, blow molding, vacuum forming, thermoforming, extrusion molding, co-extrusion, foaming, profile extrusion, combinations thereof, as well as other known and contemplated methods. For example, the compositions may be injection molded to produce a variety of molded products that may be biodegradable and/or compostable.

The articles of manufacture may include but are not limited to inks, paints, compost bag, laminate bags, agricultural films, binder for earthenware, landscape piles or spikes, bottles, strands, sheets, films, packaging materials, pipes, tubes, lids, cups, rods, laminated films, sacks, bags, cutlery, pharmaceutical capsules, foams, granulates and powders.

As used in this description, the term "biodegradable" refers to a plastic or polymeric material that will undergo at least partial biodegradation by living organisms (microbes) in anaerobic and aerobic environments (as determined by ASTM D5511), in soil environments (as determined by ASTM D5988), in freshwater environments (as determined by ASTM D5271 (EN 29408)), or in marine environments (as determined by ASTM D6691 or ISO14852). The biodegradability of biodegradable plastics can also be determined using ASTM D6868, ASTM D6400, and European EN 13432.

As used in this description, the term "compostable" refers to a biodegradable material that may be broken down into only carbon dioxide, water, inorganic compounds, and/or biomass, which does not leave any visible or toxic residue. In some embodiments, articles formed from the described compositions may be biodegradable or "compostable" as determined by ASTM D6400 and/or ASTM D6868 for industrial and/or home compostability.

The details of one or more examples are set forth in the accompanying drawings and the description below. Other features, objects, and advantages will be apparent from the description and drawings, and from the claims.

All percentages used or recited in this description refer to a percent by weight, unless specifically stated otherwise. Other aspects and advantages of this invention will be appreciated from the following detailed description.

Figure 1:
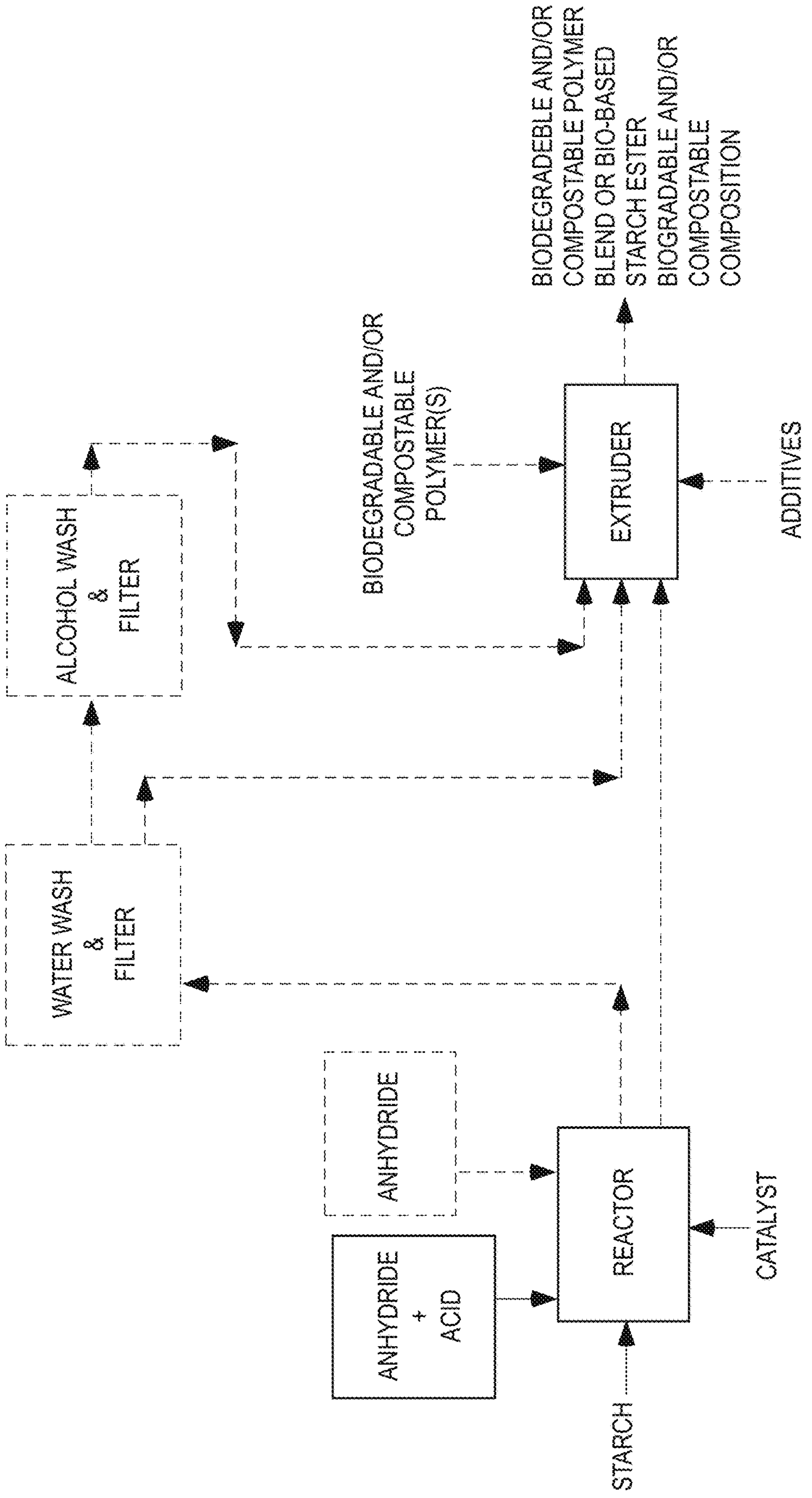
FIG. 1 is a flow diagram illustrating an exemplary proposed process for making the described bio-based starch mixed ester biodegradable and/or compostable composition.

the reactor or, as shown in FIG. 1, the anhydride and acid can first be reacted to form an acid anhydride, which is then combined with the starch in the reactor. In some instances, additional anhydride may be added to the reactor before or during the reaction process.

Suitable anhydrides may include acetic anhydride, propionic anhydride, butyric anhydride, hexanoic anhydride, maleic anhydride, succinic anhydride, phthalic anhydride, hexenyl succinic anhydride, octenyl anhydride, and stearic anhydride and mixtures thereof. The anhydride in one instance is acetic anhydride.

The acid may be a carboxylic acid and may be one or more of a $C_{2-24}$ carboxylic acid and mixtures thereof. In some cases the carboxylic acid may be $C_{10}$ to $C_{24}$ and mixtures thereof, and in some instances may be lauric acid, myristic acid, palmitic acid, stearic acid, arachidic acid, linoleic acid, linolenic acid, steridonic acid, oleic acid, and mixtures thereof. In some instances, the carboxylic acid is lauric acid, stearic acid, oleic acid and mixtures thereof.

It is contemplated that the carboxylic acid may be a saturated or an unsaturated fatty acid. Advantageous examples of carboxylic acids may include fatty acids such as lauric acid, myristic acid, palmitic acid, stearic acid, arachidic acid, linoleic acid, linolenic acid, steridonic acid, oleic acid, and mixtures thereof. In some instances the carboxylic acid is lauric acid, stearic acid, oleic acid and mixtures thereof.

As one example where the anhydride and acid are first mixed together and reacted, acetic anhydride and lauric acid may be reacted according to the proposed mechanism shown below.

Figure 8A:
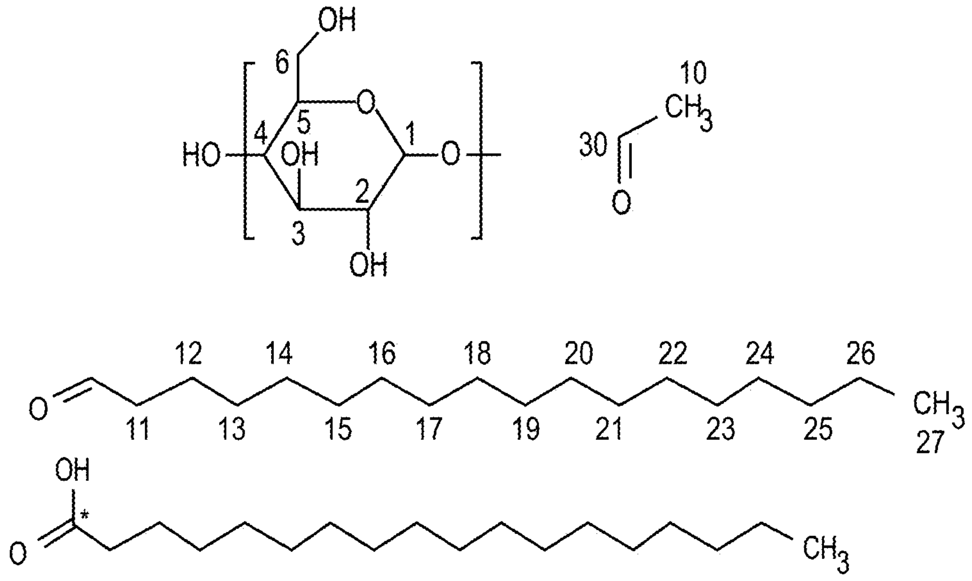
FIG. 8A shows the $^{13}$C-NMR analysis of a sample of a starch acetate stearate that has been made and water washed according to the method shown and described in connection with FIG. 5.
Figure 8A:
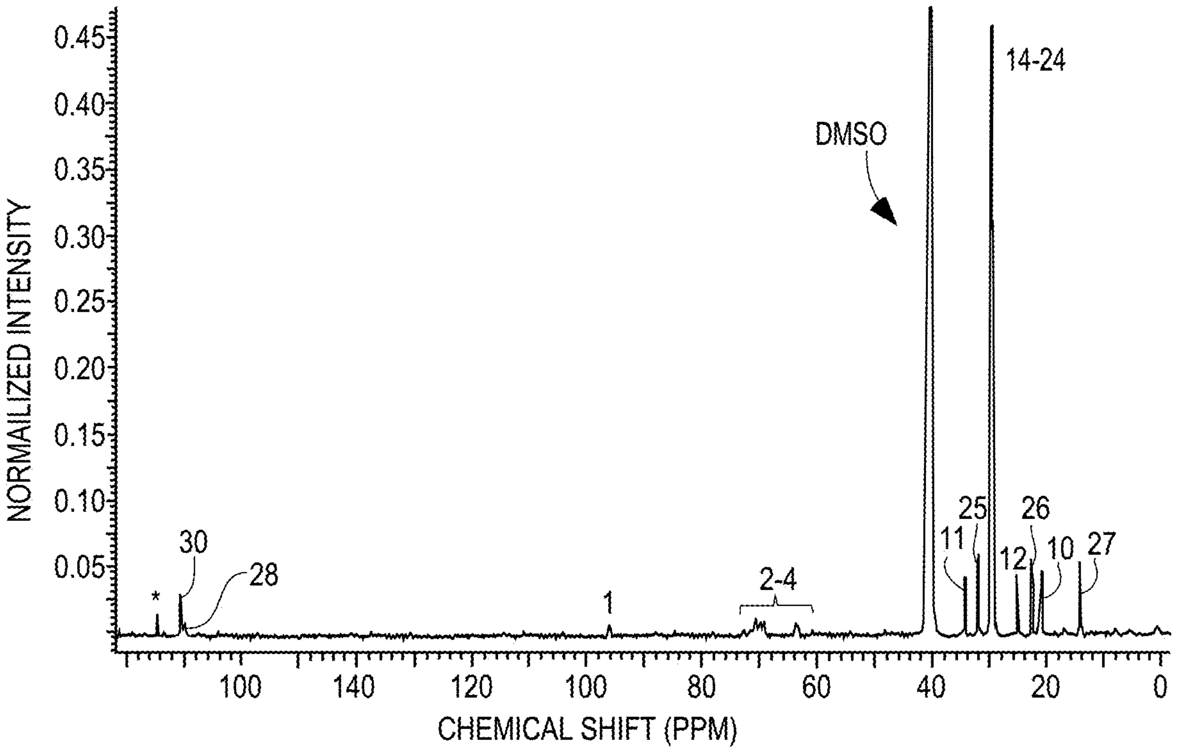
Figure 8B:
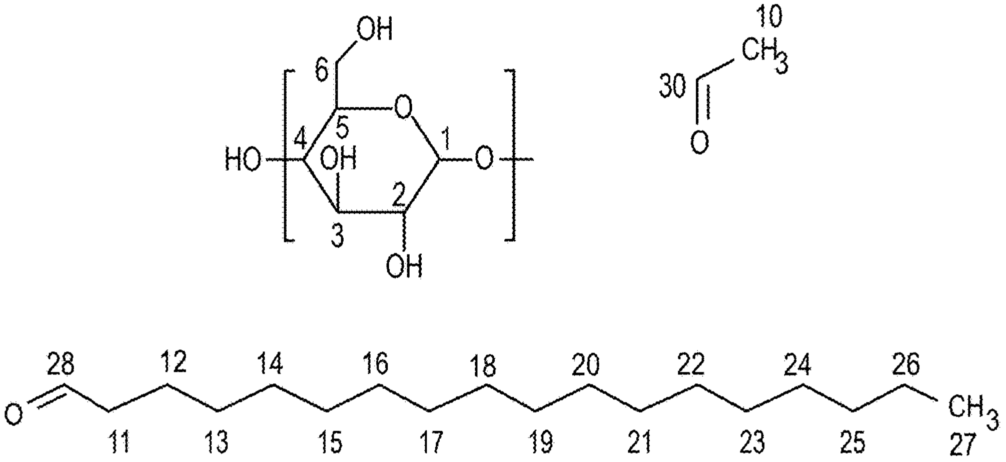
Figure 8B:
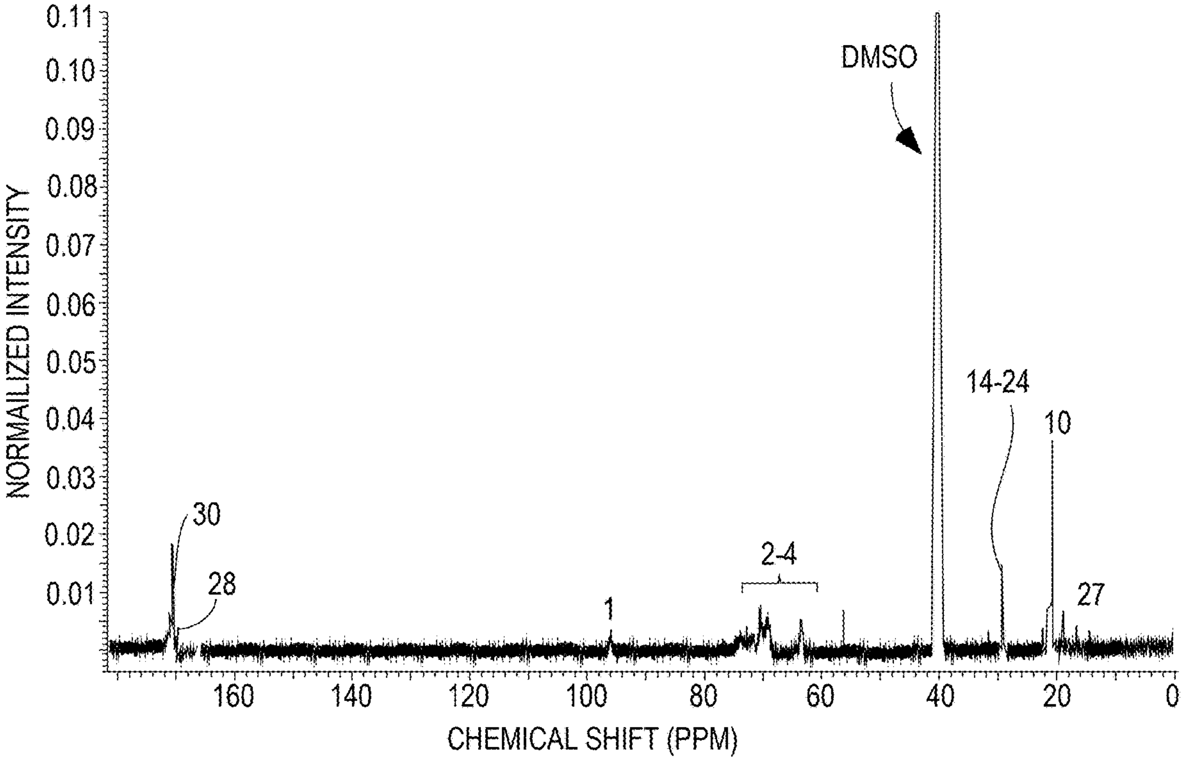

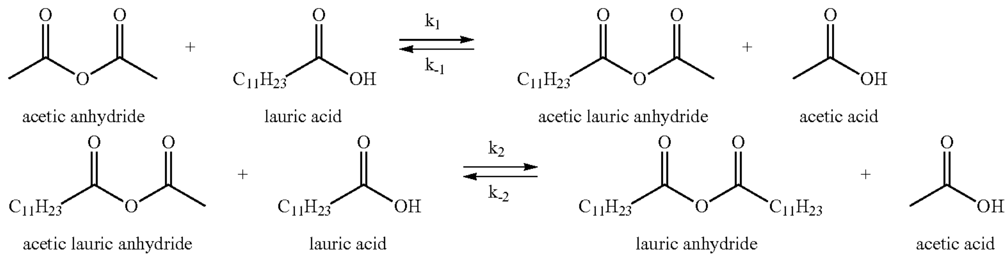

acetic anhydride, lauric acid, acetic lauric anhydride, acetic acid acetic lauric anhydride, lauric acid, lauric anhydride, acetic acid FIG. 8B shows the $^{13}$C-NMR analysis of a sample of a starch acetate stearate that has been made and ethanol washed according to the method shown and described in connection with FIG. 5.

Figure 8C:
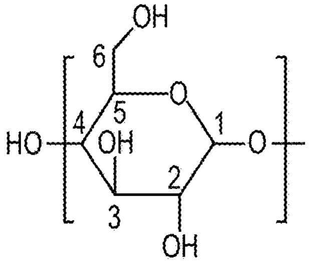
Figure 8C:
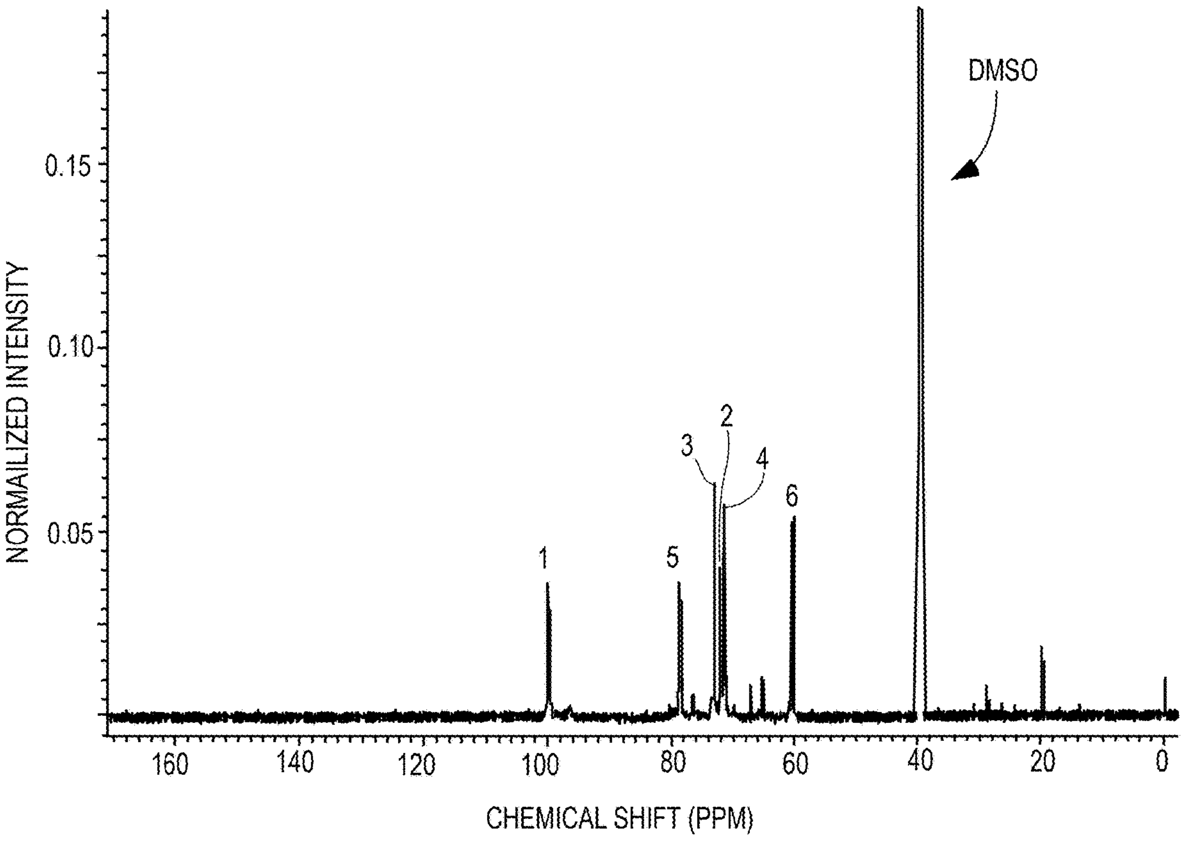

FIG. 8C shows the $^{13}$C-NMR analysis of a sample of a high amylose cornstarch used to make the starch acetate stearate tested in of FIGS. 8A and 8B.

Figure 9:
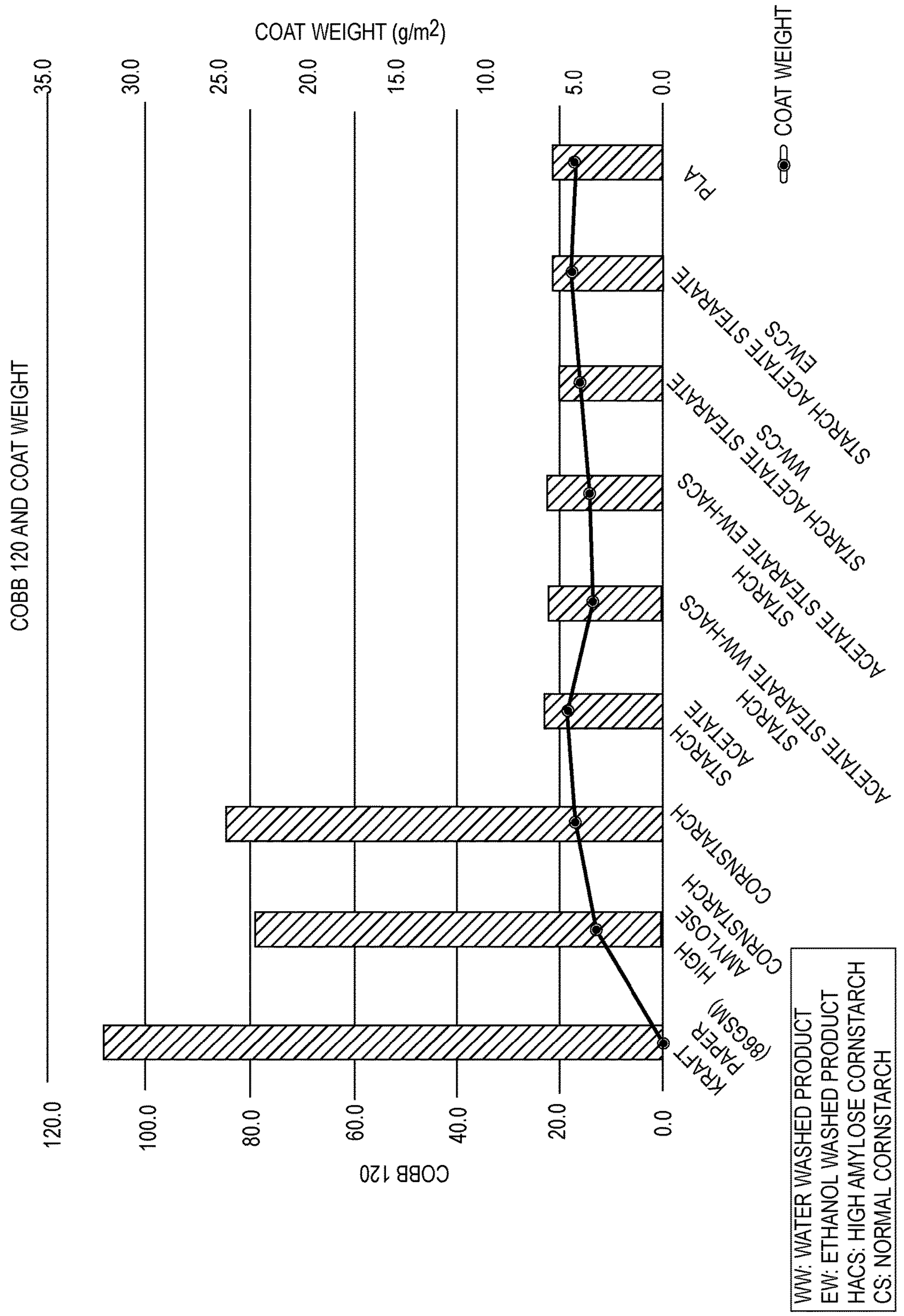

FIG. 9 shows the results of a Cobb 120 test performed according to ASTM D3285-93 that compares uncoated 86 GSM Kraft paper and coated 86 GSM Kraft paper which was coated with various coatings using various coating weights.

DETAILED DESCRIPTION

Referring to FIG. 1, a proposed flow diagram of a proposed process for making the described bio-based starch mixed ester biodegradable and/or compostable composition is shown. In general, an anhydride and an acid are combined with a starch, which in some instances is a bio-based starch, and an esterification catalyst in a reactor. It will be appreciated that the anhydride and acid can added separately to It will be appreciated that, in equilibrium, the following compounds may be present: acetic anhydride, lauric acid, acetic lauric anhydride, acetic acid, and lauric anhydride. Further, depending on ratio of the anhydride and the acid, it is believed that the ratio of the resulting mixed acid anhydride (i.e., acetic lauric anhydride) changes.

It will be appreciated that the reaction of acetic anhydride with other carboxylic acids noted above will proceed according to the reaction scheme noted above and will produce the respective mixed acid anhydrides. Thus, the reaction of acetic anhydride with stearic acid will produce, in equilibrium, acetic anhydride, stearic acid, acetic stearic anhydride, acetic acid and stearic anhydride. Similarly, the reaction of acetic anhydride with oleic acid will produce, in equilibrium, acetic anhydride, oleic acid, acetic oleic anhydride, acetic acid and oleic anhydride. With the above reaction scheme in mind, it should be noted that reference or mention of a mixed acid anhydride as the reaction product of an anhydride and an acid will include, for example, with specific reference to the reaction product of acetic anhydride and lauric acid, each of lauric acid, acetic acid, acetic anhydride, acetic lauric anhydride, and lauric anhydride Regarding the starch, as noted above, the described compositions are formed using a bio-based starch. As used in the specification and claims, the term "bio-based" refers to a starch source that is a non-petroleum source. In other words, "bio-based" refers to starch provided from a plant source and is meant to exclude fossil based starches. The bio-based starch or a derivative thereof, may be referred to as a starch or a starch component. It will be understood that the term starch or starch component when used in the specification and the claims refers to a bio-based starch or derivative thereof, unless specifically noted otherwise.

Starch $(C_6H_{10}O_5)_n$ is a mixture of linear (amylose) and branched (amylopectin) polymers. Amylose is essentially a linear polymer of α(1→4) linked D-glucopyranosyl units. Amylopectin is a highly-branched polymer of D-glucopyranosyl units containing α(1→4) linkages, with α(1→6) linkages at the branch points. The starch or starch component may be based on any native starch having an amylose content of 0 to about 100% and an amylopectin content of about 100 to 0%. In some instances, the amylose content is greater than about 50% or from about 60% to about 90%, or from about 65% to about 85%, or about 70% to about 80%. In some embodiments, the amylose content is from about 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or about 90%. In some instances, the amylopectin content is from about 10% to about 40%, or from about 15% to about 35%, or about 20% to about 30%. In some embodiments, the amylopectin content is about 10%, 11% 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38% 39%, or about 40%.

The starch component may be derived from barley, potato, wheat, rye, oat, pea, maize, corn, tapioca, sago, rice, cassava, arrachaca, buckwheat, banana, kudzu, oca, sago sorghum sweet potato, taro, yam, fava, lentil, or other tuber-bearing or grain plant. It may also be based on starches prepared from native starches by oxidizing, hydrolyzing, crosslinking, cationizing, grafting, or etherifying.

It is known that starch contains entrained or endogenous water or moisture in amounts between about 13 wt. % and about 20 wt. %. As a result, if starch is dried in a conventional manner, i.e., using heat, there exists a flammability hazard, which the described method avoids. In addition, it is believed that drying in the conventional manner may strengthen the hydrogen bonds in the starch molecule, making it more difficult for the subsequent esterification reaction to proceed. To that end, the described process contemplates removing bound and free water by reacting the starch with an anhydride (e.g., acetic anhydride) at room temperature to form an acid (e.g., acetic acid) and to reduce substantial starch degradation.

Referring back to FIG. 1, the starch mixed ester compositions may be prepared in the presence of an esterification catalyst. Suitable esterification catalysts may be selected from the groups of (i) hydroxides and/or mineral acid salts or organic acid salts or carbonates of any metals selected among alkali metals, alkaline-earth metals and amphoteric metals, (ii) organic interlayer transition catalysts and (iii) amino compounds, such as those exemplified below.

Alkali metal hydroxides such as sodium hydroxide, potassium hydroxide, lithium hydroxide, etc.; salts of organic acids and alkali metals such as sodium acetate, sodium propionate, sodium p-toluenesulfonate, etc.; alkaline-earth metal hydroxides such as barium hydroxide, calcium hydroxide, etc.; salts of organic acids and alkaline-earth metals such as calcium acetate, calcium propionate, barium p-toluenesulfonate, etc.; salts of mineral acids such as sodium phosphate, calcium phosphate, sodium bisulfite, sodium bicarbonate, potassium sulfate, etc.; acidic salts or hydroxides of amphoteric metals, such as sodium aluminate, potassium zincate, aluminum hydroxide, zinc hydroxide, etc.; carbonates such as sodium carbonate, potassium bicarbonate, etc. Typically, the alkali metal hydroxides may be provided as aqueous solutions, e.g., a 50% aqueous solution of NaOH.

Amino compounds such as dimethylaminopyridine, dimethylaminoacetic acid, etc.

Quaternary ammonium compounds such as N-trimethyl-N-propylammonium chloride, N-tetraethylammonium chloride, etc.

By varying the amount of the mixed acid anhydride, the amount of starch, the amount of the catalyst, as well as the reaction conditions, starch mixed esters with different degrees of substitution may be prepared. The ratio of the types of ester groups present on the starch mixed ester may vary greatly. When two different ester groups are present, they may be present in a range of about 20:1 to about 1:20.

A proposed reaction formula of the esterification of the starch with the mixed anhydrides may be depicted as:

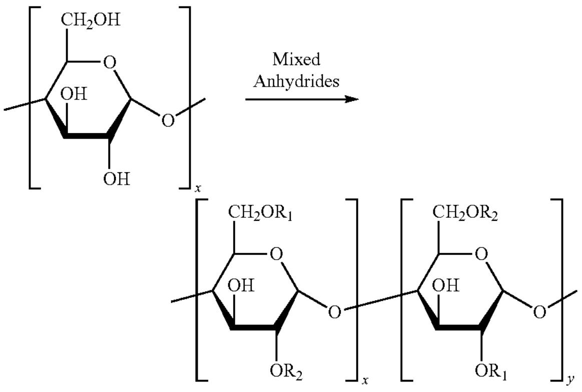

wherein x=1 to 20 and y=1 to 20; wherein $R_1$ is from acetic, propionic, butyric, hexanoic, maleic, succinic, phthalic, hexenyl succinic, octenyl, and stearic and mixtures thereof and wherein $R_2$ is from $C_{2-24}$ carboxylic acid, and in some cases may be $C_{10}$ to $C_{24}$, and in some instances may be lauric acid, myristic acid, palmitic acid, stearic acid, arachidic acid, linoleic acid, linolenic acid, steridonic acid, oleic acid, and mixtures thereof. In some instances, $R_2$ is from lauric acid, stearic acid, oleic acid and mixtures thereof.

It will be appreciated that the starch mixed ester includes at least two and in some cases three different ester residues attached to the same starch molecule. To that end, the starch mixed ester includes both long- and short-chain carboxyl acid components. As an example, it is contemplated that the starch mixed ester may include a mix of acetate and laurate, a mix of acetate and stearate, a mix of acetate and oleate, or a mixture of each mixt.

The total degree of substitution of the esterified starch may range from about 0.1 to 2.9, and in some instances is greater than 1.0. Accordingly, in some instances, it is contemplated that the total degree of substitution may be from about 1.5 to about 2.9 or about 1.8 to about 2.7 or about 2.0 to about 2.5 or about 2.2 to about 2.4. In some embodiments, the total degree of substitution may be about 1.5, 1.6, 1.7, 1.8, 1.9, 2.0, 2.1, 2.2, 2.3, 2.4, 2.5, 2.6, 2.7, 2.8, about 2.9, or within any range that may be formed from each of the preceding values. It is expected that the starch mixed ester compositions will exhibit a desired balance in mechanical properties, water resistance, processability and the rate of biodegradation.

Generally, the degree of substitution of the acetate is from about 0.5 to about 2.4, or about 0.6 to about 2.3 or about 1.0 to about 2.2, or about 1.6 to about 2.2. In some instances, the degree of substitution of the acetate is from about 0.5, 0.6, 0.7, 0.8, 0.9, 1.0, 1.1, 1.2, 1.3, 1.4, 1.5, 1.6, 1.7, 1.8, 1.9, 2.0, 2.1, about 2.2, or within any range that may be formed from each of the preceding values. The degree of substitution of the other ester residue (i.e., from the carboxylic acid, e.g., laurate, stearate, oleate), may be from about 1 to about 2.5 or about 1.1, 1.2, 1.3, 1.4, 1.5, 1.6, 1.7, 1.8, 1.9, 2.0, 2.1, 2.2, 2.3, 2.4, or about 2.5. In some instances, the degree of substitution of the other ester residue (i.e., from the carboxylic acid, e.g., laurate, stearate, oleate), may be from about 0.01 to about 1.0, or about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, about 2.5, or within any range that may be formed from each of the preceding values.

The resulting starch mixed esters may have a glass transition temperature ranging from about 125° C. to about 165° C., In some instances, the resulting starch mixed esters have a glass transition temperature of about 125° C., 126° C., 127° C., 128° C., 129° C., 130° C., 131° C., 132° C., 133° C., 134° C., 135° C., 136° C., 137° C., 138° C., 139° C., 140° C., 141° C., 142° C., 143° C., 144° C., 145° C. 146° C., 146° C., 148° C., 149° C., 150° C., 151° C., 152° C., 153° C., 154° C., 155° C., 156° C., 157° C., 158° C., 159° C., 160° C., 161° C., 162° C., 163° C., 164° C., or about 165° C.

According to one embodiment, the mixed acid anhydride is combined with the starch to disperse the starch, after which the catalyst may be added so that the reaction occurs for a period of time at a temperature between about 100° C. to about 200° C., or about 130° C. to about 155° C. The resulting product may be cured in water (which may be effective to separate unreacted acid anhydride and fatty acid), after which the cured product may be pulverized, washed, neutralized, and dehydrated. The dehydrated product may then be dried to provide a dried product. In addition, it is contemplated that the dried water washed product may be washed with alcohol, which will remove unreacted fatty acid, and then dried. Alternatively, the dehydrated product may be directed to an extruder for further processing optionally with additives or other biodegradable and/or compostable polymers, as will be explained in more detail below. As yet another alternative, it is contemplated that the water and alcohol washed product may be dried and then blended with one or more biodegradable and/or compostable polymers.

The optional additives may include one or more members selected from the group consisting of extenders; fillers; wood derived materials; oxides of magnesium, aluminum, silicon, and titanium; alkali and alkaline earth metal salts; lubricants; mold release agents; acid scavengers; plasticizers; UV stabilizers; coloring agents; flame retardants; antioxidants; thermal stabilizers; and mixtures thereof.

Figure 2:
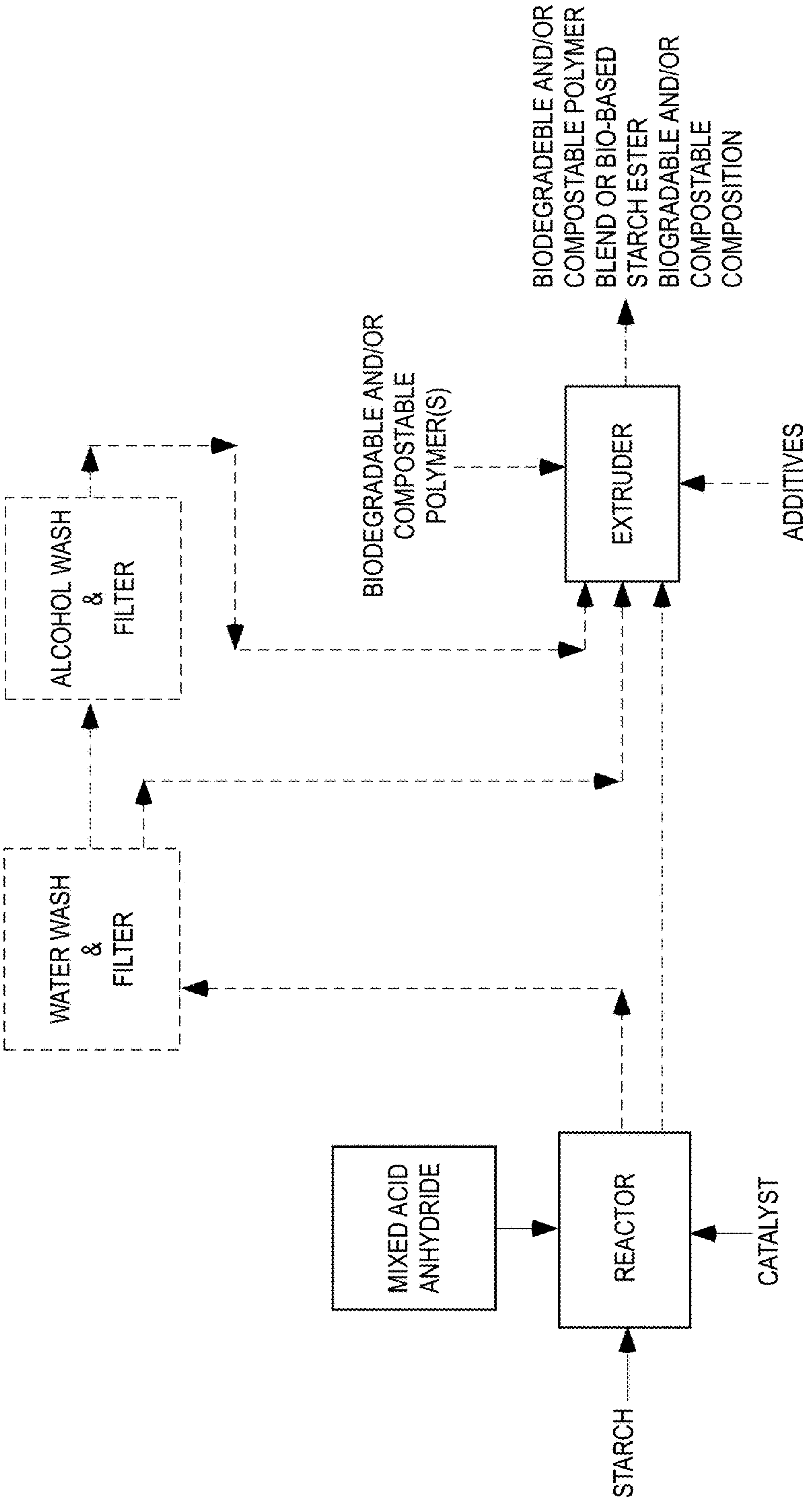
FIG. 2 is a flow diagram illustrating an alternative exemplary proposed process for making the described bio-based starch mixed ester biodegradable and/or compostable composition.

Turning now to FIG. 2, a proposed flow diagram of an alternative proposed process for making a bio-based starch mixed ester biodegradable and/or compostable composition is shown. In this process, the anhydride and one or more carboxylic acids may be reacted to form a mixed acid anhydride, which is thereafter mixed and reacted with the bio-based starch and catalyst to form bio-based starch mixed ester biodegradable and/or compostable composition. In some examples, the anhydride is acetic anhydride and the carboxylic acid is lauric acid, stearic acid, oleic acid and mixtures thereof, which after reaction will form a mixed acetic-fatty anhydride. Thus, the resulting mixed acid anhydride may include acetic-lauric anhydride, acetic-stearic anhydride, acetic-oleic anhydride, and mixtures thereof.

In one embodiment, a first mixed acid anhydride and a second mixed acid anhydride are separately formed and, after formation mixed together prior to reacting the mixture with a starch and a catalyst. In this regard, a first anhydride and a first acid may be reacted to form a first mixed acid anhydride. In addition, a second anhydride and a second acid may be reacted to form a second mixed acid anhydride. While the first and second anhydride may differ, generally they are the same and, in those instances, it may be acetic anhydride. It is contemplated that the first and second acids differ. Thereafter, the first mixed acid anhydride and second mixed acid anhydride may be mixed together and then reacted with a starch in the presence of a catalyst to form a starch mixed ester biodegradable and/or compostable composition.

As an example, the first and second anhydride may include acetic, propionic, butyric, hexanoic, maleic, succinic, phthalic, hexenyl succinic, octenyl, and stearic anhydride and mixtures thereof. The first and second anhydride may be the same or different. In some cases, the first and second anhydride is the same and in one instance the first and second anhydride is acetic anhydride.

The first and second acid differ and each may be a carboxylic acid and may be a $C_{2-24}$ carboxylic acid and mixtures thereof. In some cases they may be a $C_{10}$ to $C_{24}$, carboxylic acid and mixtures thereof and in some instances may be lauric acid, myristic acid, palmitic acid, stearic acid, arachidic acid, linoleic acid, linolenic acid, steridonic acid, oleic acid, and mixtures thereof. In some instances, the carboxylic acid is from lauric acid, stearic acid, oleic acid and mixtures thereof.

It is contemplated that the first and second carboxylic acid may be saturated or an unsaturated fatty acid. Advantageous examples of the first and second carboxylic acids include lauric acid, myristic acid, palmitic acid, stearic acid, arachidic acid, linoleic acid, linolenic acid, steridonic acid, oleic acid, and mixtures thereof. In some instances the first and second carboxylic acid differ and are selected from lauric acid, stearic acid, and oleic acid. As noted above, after separate formation of the first and second mixed acid anhydride, the first and second mixed acid anhydride may be mixed and thereafter reacted with the starch in the presence of a catalyst to form a starch mixed ester biodegradable and/or compostable composition.

In another embodiment, a first mixed acid anhydride, a second mixed acid anhydride, and a third mixed acid anhydride are separately formed and, after formation mixed together prior to reacting the mixture with a starch. In this regard, each of the first, second, and third mixed acid anhydride differ. In accord with this embodiment, a first anhydride and a first acid may be reacted to form a first mixed acid anhydride, a second anhydride and a second acid may be reacted to form a second mixed acid anhydride, and a third anhydride and a third acid may be reacted to form a third mixed acid anhydride. While each of the first, second, and third anhydride may differ, generally it is the same and, in those instances where it is the same, it may be acetic anhydride.

In some instances, each of the first, second, and third acids may and each may be a carboxylic acid and may be a $C_{2-24}$ carboxylic acid and mixtures thereof. In some cases they may be $C_{10}$ to $C_{24}$, and in some instances they may be lauric acid, myristic acid, palmitic acid, stearic acid, arachidic acid, linoleic acid, linolenic acid, steridonic acid, oleic acid, and mixtures thereof. It is contemplated that the first, second, and third carboxylic acid may be saturated or an unsaturated fatty acid. Advantageous examples of the first, second and third carboxylic acids include lauric acid, myristic acid, palmitic acid, stearic acid, arachidic acid, linoleic acid, linolenic acid, steridonic acid, oleic acid, and mixtures thereof. In some instances the first, second, and third carboxylic acid differ and are selected from lauric acid, stearic acid, and oleic acid. As noted above, after separate formation of the first, second, and third mixed acid anhydride, the first, second, and third mixed acid anhydride may be mixed and thereafter reacted with the starch in the presence of a catalyst to form a starch mixed ester biodegradable and/or compostable composition.

Thereafter, the starch mixed ester biodegradable and/or compostable composition may be cured in water (which may be effective to separate unreacted acid anhydride and fatty acid), after which the cured product may be pulverized, washed, neutralized, and dehydrated. The dehydrated product may then be dried to provide a dried product. In addition, it is contemplated that the dried water washed product may be washed with alcohol, which will remove unreacted fatty acid, and then dried. Alternatively, the dehydrated product may be directed to an extruder for further processing optionally with additives or other biodegradable and/or compostable polymers, as will be explained in more detail below. As yet another alternative, it is contemplated that the water and alcohol washed product may be dried and then blended with one or more biodegradable and/or compostable polymers.

Figure 3:
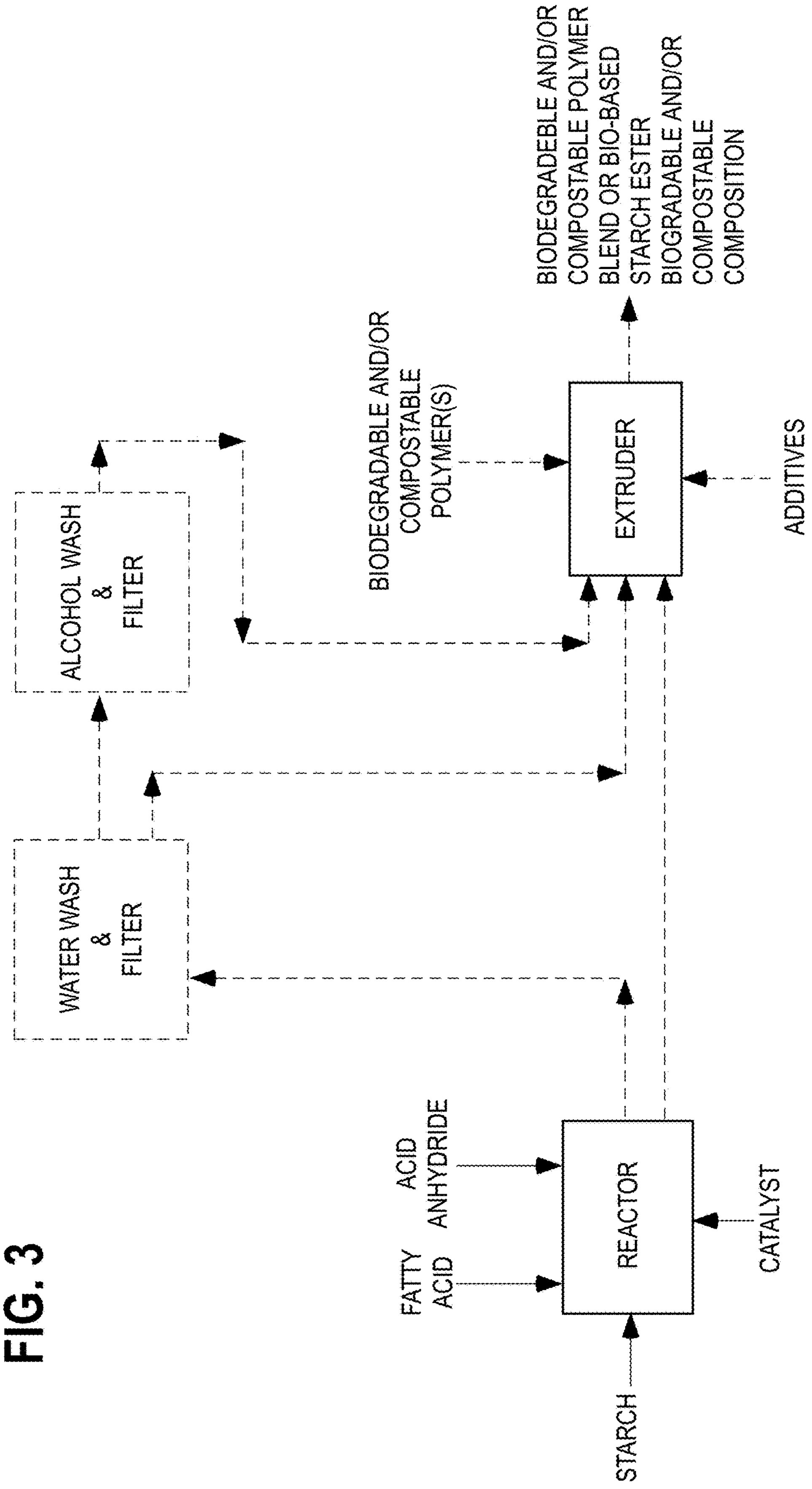
FIG. 3 is a flow diagram illustrating an alternative exemplary proposed process for making the described bio-based starch mixed ester biodegradable and/or compostable composition.

Turning now to FIG. 3, an alternative process for preparing a starch mixed ester biodegradable and/or compostable composition is shown. In this process, a starch, fatty acid, acid anhydride, and catalyst are provided to a reactor and reacted for a period of time under suitable conditions to dehydrate the starch. Thereafter, additional fatty acid and acid anhydride are added for a period of time and under suitable conditions (e.g., from 0.5 to 4 hours at a temperature between about 100° C. to about 140° C.) to esterify the starch and form a starch mixed ester biodegradable and/or compostable composition.

The resulting product may be cured in water (which may be effective to separate unreacted acid anhydride and fatty acid), after which the cured product may be pulverized, washed, neutralized, and dehydrated. The dehydrated product may then be dried to provide a dried product. In addition, it is contemplated that the dried water washed product may be washed with alcohol, which will remove unreacted fatty acid, and then dried. Alternatively, the dehydrated product may be directed to an extruder for further processing optionally with additives or other biodegradable and/or compostable polymers, as will be explained in more detail below. As yet another alternative, it is contemplated that the water and alcohol washed product may be dried and then blended with one or more biodegradable and/or compostable polymers.

Figure 4:
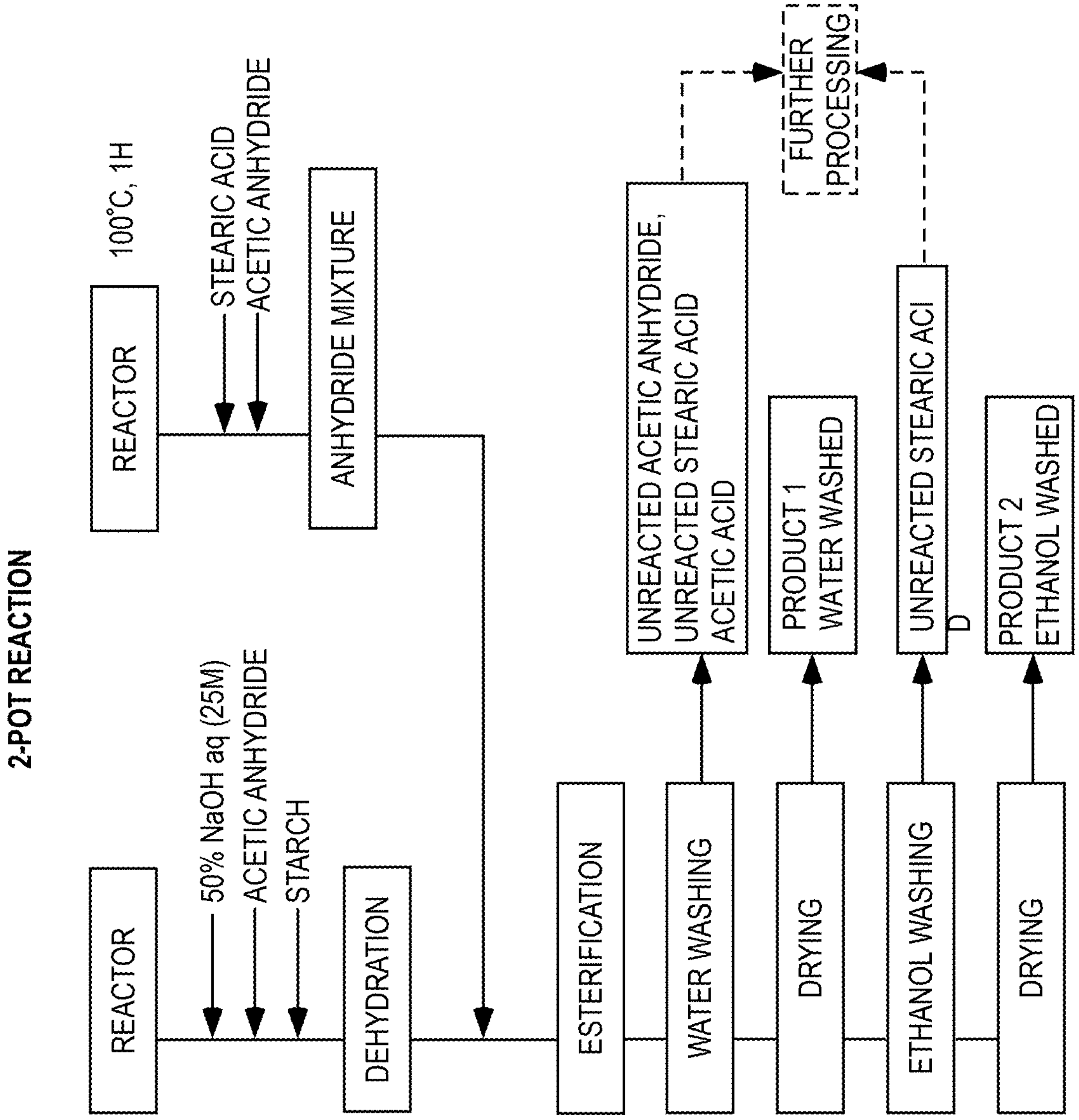
FIG. 4 is a flow diagram illustrating an alternative exemplary proposed process for making the described bio-based starch mixed ester biodegradable and/or compostable composition.

Turning now to FIG. 4, a two-pot reaction scheme, i.e., a two reactor reaction scheme for making a starch mixed ester composition is shown. This process will be described using stearic acid, acetic anhydride, and sodium hydroxide as exemplars for each of the acid, acid anhydride, and catalyst, respectively. In one reactor, acetic anhydride and starch are mixed with sodium hydroxide to dehydrate the starch and remove the water from the sodium hydroxide solution and form acetic acid according to the following reaction.

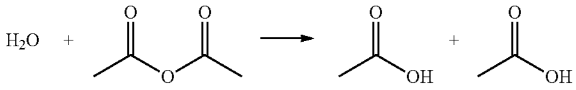

acetic anhydride acetic acid acetic acid

The reaction may be conducted for a period of time from about 1 hour to about 48 hours or about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, or 48 hours or any range that may be created from these values. The reaction may be conducted at a temperature from about 20° C. to about 35° C. or about 21, 22, 23, 24, 25, 26, 27, 28, 29, 30, 31, 32, 33, 34, or about 35° C. or any range that may be created from these values.

In the other reactor, stearic acid and acetic anhydride are mixed and reacted under suitable conditions to form a mixed acid anhydride, i.e., acetic anhydride, stearic acid, acetic stearic anhydride, acetic acid, and stearic anhydride as shown below in the following reaction schemes.

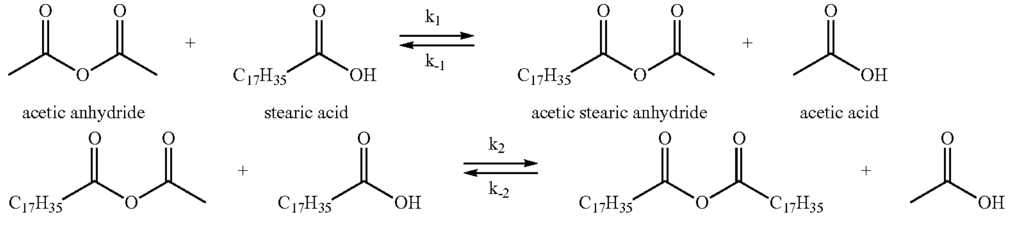

acetic anhydride stearic acid acetic stearic anhydride acetic acid acetic stearic anhydride stearic acid stearic anhydride acetic acid In this regard, suitable reaction conditions may include a reaction temperature between about 80° C. to about 120° C., or about 90° C. to about 110° C., or about 95° C. to about 105° C. To this end, the temperature may be about 90° C., or about 91, 92, 93, 94, 95, 96, 97, 98, 99, 100, 101, 102, 103, 104, 105, 106, 107, 108, 109, or about 110° C., or any range that may be created from these values.

Similarly, the time of reaction may be from about 15 minutes to about 360 minutes, or about 30 minutes to about 300 minutes, or about 45 minutes to about 240 minutes, or about 50 minutes to about 120 minutes, or about 55 minutes to about 90 minutes, or about 60 minutes. To that end, the time of reaction may be from about 45, or about 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79. 80 81, 82, 83, 84, 85, 86. 87. 88. 89 or about 90 minutes, or any range that may be created from these values.

Thereafter, the mixed acid anhydride is mixed with the dehydrated starch and reacted under suitable conditions to form a starch mixed ester composition. Suitable reaction conditions include reacting at temperature from about 125° C. to about 165° C., or from about 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, or about 165° C. or any range that may be created from these values. To that end the time of reaction may be from about 1 to 15 hours or about 1, 2, 3, 4, 5, 6, 7, 8, 9, 10, 11, 12, 13, 14, or about 15 hours or any range that may be created from these values.

The starch mixed ester composition may then be washed with water to remove unreacted acetic anhydride, unreacted stearic acid, and acetic acid and then dried to form a water-washed starch mixed ester composition. The dried water-starch mixed ester composition may be further processed such as by pelletizing, forming into articles, and/or blending with other biodegradable and/or compostable polymers (and additives), as shown and described in connection with FIGS. 1-3.

In addition and alternatively, the dried starch mixed ester composition may be further washed with alcohol, which will remove the unreacted stearic acid remaining after the water washing, after which, the alcohol washed starch mixed ester composition can be dried to form an alcohol washed starch mixed ester composition. The dried alcohol-starch mixed ester composition may be further processed such as by pelletizing, forming into articles, and/or blending with other biodegradable and/or compostable polymers (and additives), as shown and described in connection with FIGS. 1-3. The removed unreacted acetic anhydride, unreacted stearic acid, and acetic acid from the water washing and the removed unreacted stearic acid from the alcohol washing, if performed, may be sent to further processing or treatment for re-use or other purposes.

Figure 5:
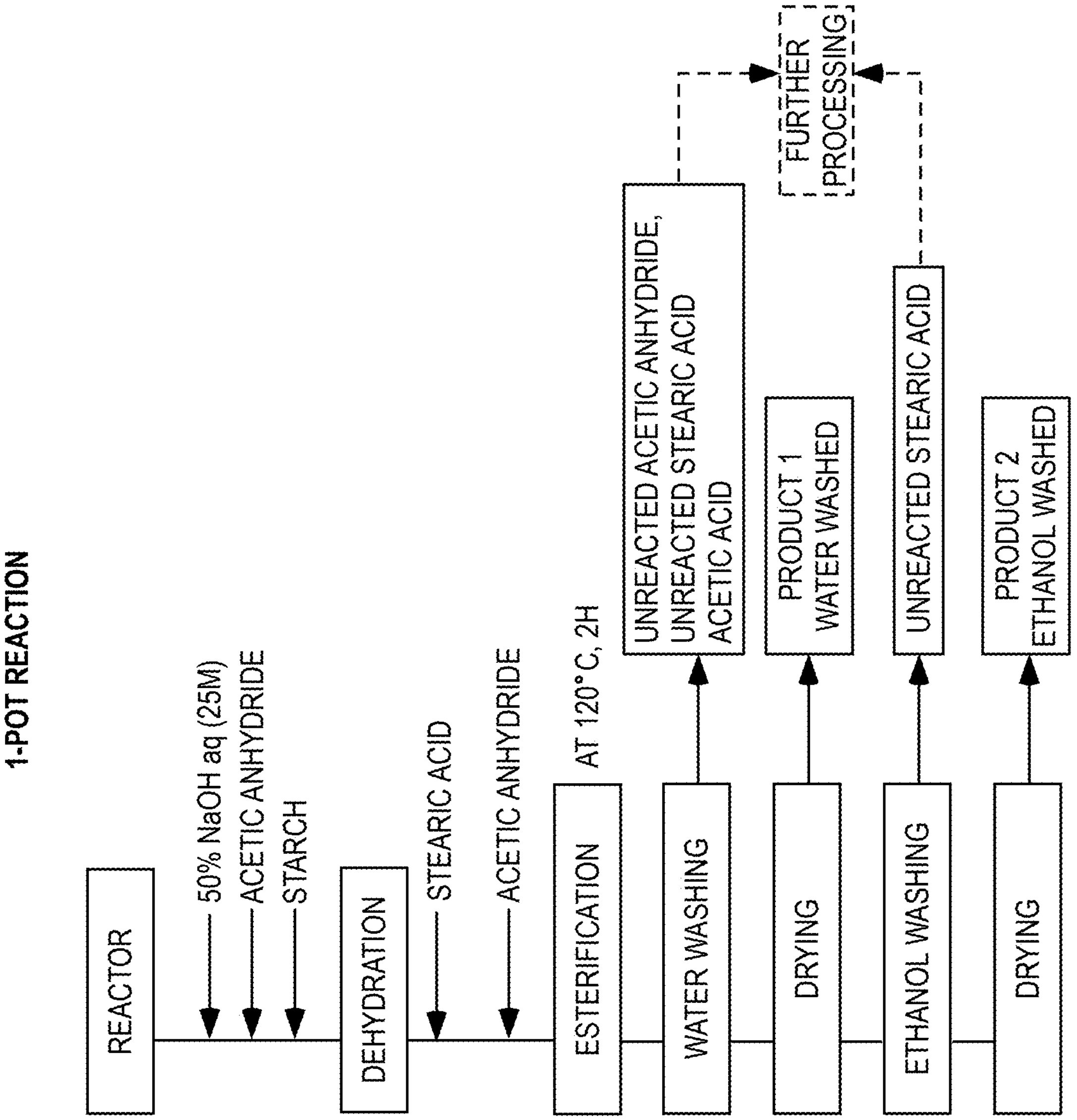
FIG. 5 is a flow diagram illustrating an alternative exemplary proposed process for making the described bio-based starch mixed ester biodegradable and/or compostable composition.

Turning now to FIG. 5, a single pot reaction scheme, i.e., a single reactor reaction scheme for making a starch mixed ester composition is shown. This process will be described using stearic acid, acetic anhydride, and sodium hydroxide as exemplars for each of the acid, acid anhydride, and catalyst, respectively. In the reactor, acetic anhydride and starch are mixed with an aqueous solution of sodium hydroxide to dehydrate the starch, remove the water from the sodium hydroxide solution by reaction to form acetic acid.

Suitable reaction conditions include reacting at a temperature of about from about 20° C. to about 35° C. or about 21, 22, 23, 24, 25, 26, 27, 28, 29, 30, 31, 32, 33, 34, or about 35° C. or any range that may be created from these values. The reaction may be conducted for a period of time ranging from about 1 minute to about 60 minutes, or about 5 minutes to about 30 minutes or about 10 minutes to about 20 minutes or about 15 minutes. In some instances, the reaction may be conducted for a period of time of about 5 minutes or about 6, 7, 8, 9, 10, 11, 12, 13, 14, 15, 16, 17, 18, 19, 20, 21, 22, 23, 24, or about 25 minutes or any range that may be created from these values.

Based on 100 grams of cornstarch (in some instances, high amylose cornstarch), which is about 0.62 mol, the amount of acetic anhydride added to the reactor will be about 1.0 mol to about 2.0 mol, or about 1.0, 1.1, 1.2, 1.3. 1.4, 1.5, 1.6, 1.7, 1.8, 1.9, or about 2.0. The amount of sodium hydroxide added to the reactor will be from about 0.05 mol to about 0.15 mol, or about 0.06, 0.07, 0.08, 0.09, 0.10, 0.11, 0.12, 0.13, or about 0.15.

Upon completion of the reaction, i.e., at the end of the reaction time noted above, stearic acid and an additional amount of and acetic anhydride are added to the reactor and reacted under suitable conditions to form a starch mixed ester composition. In this regard, the amount of stearic acid will be about 0.1 to about 0.6 mol, or about 0.1, 0.2, 0.3, 0.4, 0.5, or about 0.6 mol. The amount of additional acetic anhydride added to the reactor may be from about 0.5 mol to 1.5 mol or about 0.5, 0.6, 0.7, 0.8, 0.9, 1.0, 1.1, 1.2, 1.3, 1.4, or about 1.5 mol.

Based on the foregoing, the skilled artisan will appreciate that where a greater amount of cornstarch is used, the amounts of the acetic anhydride (in each of the dehydration and esterification steps), sodium hydroxide, and stearic acid will be increased accordingly.

Suitable reaction conditions may include a reaction temperature between about 100° C. to about 180° C., or about 110° C. to about 170° C., or about 115° C. to about 160° C. To this end, the temperature may be about 100° C., or about 101, 102, 103, 104, 105, 106, 107, 108, 109, 110, 111, 112, 113, 114, 115, 116, 117, 118, 119, 120, 121,122, 123, 124, 125, 126, 127,128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168. 169, 170, 171, 172, 173, 174, 175, 176, 177. 178, 179, or about 180° C., or any range that may be created from these values.

The time of reaction may be from about 30 minutes to about 360 minutes, or about 60 minutes to about 300 minutes, or about 90 minutes to about 240 minutes, or about 100 minutes to about 180 minutes, or about 110 minutes to about 150 minutes, or about 120 minutes. To that end, the time of reaction may be from about 100 minutes, or about 101, 102, 103, 104, 105, 106, 107, 108, 109, 110, 111, 112, 113, 114, 115, 116, 117, 118, 119, 120, 121,122, 123, 124, 125, 126, 127,128, 129, 130, 131, 132, 133, 134, 135, 136, 137, 138, 139, or about 140 minutes, or any range that may be created from these values.

The starch mixed ester composition is then washed with water to remove unreacted acetic anhydride, unreacted stearic acid, and acetic acid and then dried to form a water-washed starch mixed ester composition. The dried water-starch mixed ester composition may be further processed such as by pelletizing, forming into articles, and/or blending with other biodegradable and/or compostable polymers (and additives), as shown and described in connection with FIGS. 1-3.

In addition and alternatively, the dried starch mixed ester composition may be further washed with alcohol, which will remove the unreacted stearic acid remaining after the water washing, after which, the alcohol washed starch mixed ester composition can be dried to form an alcohol washed starch mixed ester composition. The dried alcohol-starch mixed ester composition may be further processed such as by pelletizing, forming into articles, and/or blending with other biodegradable and/or compostable polymers (and additives), as shown and described in connection with FIGS. 1-3. The removed unreacted acetic anhydride, unreacted stearic acid, and acetic acid from the water washing and the removed unreacted stearic acid from the alcohol washing, if performed, may be sent to further processing or treatment for re-use or other purposes.

Blends of Starch Mixed Esters with Other Biodegradable and/or Compostable Polymers As intimated above, it is contemplated that the described starch mixed ester biodegradable and/or compostable compositions may be blended with one or more other biodegradable and/or compostable polymers to form a blend composition. The blends may be prepared by mixing or melt processing using an extruder or similar apparatus, as indicated in FIGS. 1-3.

In this regard, the blend may include from about 20% to about 90% of the described starch mixed ester composition and from about 10% to about 80% of at least one other biodegradable and/or compostable polymer. For example, the described starch mixed ester composition may be present in the blend in an amount of about 20%, 25%, 30%, 35%, 40%, 45%, 50%, 55%, 60%, 65%, 70%, 75%, 80%, 85%, or about 90%. The at least one other biodegradable and/or compostable polymer may be present in the blend in an amount of about 10%, 15%, 20%, 25%, 30%, 35%, 40%, 45%, 50%, 55%, 60%, 65%, 70%, 75%, or about 80%.

With respect to the starch mixed ester composition, it is contemplated that the starch mixed ester composition that is blended with the other biodegradable and/or compostable polymer may be the starch mixed ester composition prior to water washing, after water washing, or after alcohol washing. In each instance, the starch mixed ester composition will typically be dried prior to blending. In those instances where the starch mixed ester composition is blended after water washing and drying, the amount of unreacted fatty acid (e.g. stearic acid) may be in a range from about 20% to about 40% with respect to the starch mixed ester composition. To this end, the amount of unreacted fatty acid (e.g. stearic acid) present in the starch mixed ester composition may be about 20%, 21, 22, 23, 24, 25, 26, 27, 28, 29, 30, 31, 32, 33, 34, 35, 36, 37. 38, 39, or about 40%

The at least one other biodegradable and/or compostable polymer in the blend may be a starch biodegradable and/or compostable polymer and may also include biodegradable and/or compostable polymers such as polylactide (PLA), poly(hydroxybutyrate) (PHB), polycaprolactone (PCL), polyhydroxy butyrate valerate (PHB-V), poly(β-hydroxyalkanoate) (PHA), Poly(1,4-butylene succinate) (PBS), polybutylene adipate terephthalate (PBAT), poly(vinyl alcohol) (PVA), cellulose-based ester derivatives or a mixture thereof.

In some aspects, the at least one other biodegradable and/or compostable polymer may be a linear polyester derived from hydroxyl-carboxylic acids that have the general formula:

$$HO—(C_nH_{2n})—COOH \quad (1)$$

where n is an integer from 1 to 21, preferably an integer from 1 to 7, and more preferably is 1, 2, 3, 4 or 5.

Such acids are for example glycolic acid (n=1), lactic acid (n=2 and wherein the hydroxyl group is fixed in the alpha-position), hydroxy butyric acid and hydroxy isobutyric acid (n=3), hydroxy valeric acid (n=4), hydroxy caproic acid (n=5) where in each case the hydroxy group is fixed in the terminal position.

Methods for the preparation of linear polyesters of the type as derived from such hydroxy-carboxylic acid are known in the art. Many of these hydroxy-carboxylic acids are known to form a cyclic ester, i.e. a lactone, which is preferably used for producing the corresponding polyester. Hydroxy-caproic acid for example forms a cyclic ester known as 6-caprolactone, which can be polymerized as such. Such lactones are known. Preferred from such polylactones is poly(6-caprolactone).

The linear polyesters, derived from the combination of a diacid and a diol, as used in the present invention may be described by the following formula:

(2)

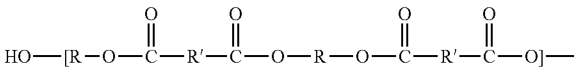

where R is an aliphatic hydrocarbon residue with 2, 4 or 6 carbon atoms; and R' is an aliphatic saturated or unsaturated divalent hydrocarbon residue with 2 to 22 carbon atoms.

Examples of suitable linear polyesters can be described by the following formula:

(3)

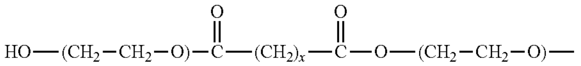

wherein x is 2 (poly(ethylene succinate)) or x is 4 (polyethylene adipate)). The linear polyesters as used in the present invention may be, as mentioned, derived from a hydroxy-carboxylic acid or a mixture of such acids or from a corresponding lactone or a mixture of such lactones. The linear polyesters may also be a physical mixture of different polyester types. Examples of such linear polyesters include poly(3-propiolactone), poly(5-valerolactone), poly(6-caprolactone), poly(6-decalactone), poly(7-enamtholactone), poly (8-caprylolactone), poly(12-laurolactone), poly(15-pentadecanolactone), poly(hydroxybutyrate), poly (hydroxyvalerate).

It is contemplated that a plasticizer may be added to the blend composition to provide greater material processability and product flexibility. Molded articles and films prepared from the blend compositions may be modified by mixing with a variety of low molecular-weight ester plasticizers of the solvent type. An obvious requirement of these plasticizers is that they are biodegradable and/or compostable. Examples of such plasticizers include a variety of esters, such as phthalate esters (dimethyl-, diethyl-, dipropyl-, dibutyl-, dihexyl-, diheptyl-, dioctyl-, etc.), dimethyl- and diethylsuccinate and related esters, glycerol triacetate (triacetin), glycerol mono- and diacetate, glycerol mono-, di and tripropionate, glycerol tributanoate (tributyrin), glycerol mono- and dibutanoate, glycerol mono-, di- and tristearate, and other related glycerol esters, lactic acid esters, citric acid esters, adipic acid esters, stearic acid esters, oleic acid esters, ricinoleic acid esters, other fatty acid esters, erucic acid esters, soybean oil, castor oil, and various other biodegradable and/or compostable esters known in the chemical arts.

Inorganic and organic fillers may be included in the blend compositions to extend the range of properties of molded articles. Such inorganic fillers may include talc (hydrous magnesium silicate), titanium dioxide, calcium carbonate, clay, sand, chalk, limestone, diatomaceous earth, silicates, boron nitride, mica, glass, quartz, and ceramics, and biodegradable and/or compostable organic fillers such as starch, cellulose, wood flour and fibers, pecan fibers, and other well-known inorganic and organic filler materials.

As noted above the blends may be formed by extruding together the starch mixed ester composition with a biodegradable and/or compostable polymer and additives to create, for example, pellets of the blend, which can then be formed into articles or manufacture such as films and other molded articles.

Articles of Manufacture

It is contemplated that the starch mixed ester biodegradable and/or compostable compositions and the blends of the starch mixed ester biodegradable and/or compostable compositions and one or more other biodegradable and/or compostable polymers may be processed by various methods known in the art such as, but not limited to, extrusion, injection molding, compression molding, filming, blow molding, vacuum forming, thermoforming, extrusion molding, co-extrusion, foaming, profile extrusion, combinations thereof, as well as other known and contemplated methods. In this regard, it is contemplated that the starch mixed ester compositions may be formed into articles such as, but not limited to, inks, paints, compost bag, laminate bags, agricultural films, binder for earthenware, landscape piles or spikes, bottles, strands, sheets, films, packaging materials, pipes, tubes, lids, cups, rods, laminated films, sacks, bags, cutlery, pharmaceutical capsules, foams, granulates and powders.

The starch mixed ester compositions and the blends of the starch mixed ester compositions and one or more other biodegradable and/or compostable polymers may also find application as (1) Films and sheet formed by extrusion, casting, rolling, inflation, etc.

(2) Lamination and coatings on paper, sheet, film, non-woven fabric, etc.

(3) Additives to be incorporated into paper during the paper making process to impart special functions to the paper and paper products.

(4) Additives to be incorporated into non-woven fabric during its manufacturing process to impart special functions to the non-woven fabrics and their products.

(5) Aqueous emulsions or suspensions for use with paints, inks, and the like.

(6) Solid molded products such as landscaping piles produced by injection molding, extrusion molding, blow molding, transfer molding, compression molding, etc.

The following examples may provide additional details about the described composition and methods in accordance with this disclosure.

Example 1

225 g of acetic anhydride and 150 g of lauric acid were placed in a 1 L separable flask, heated, and stirred at 60° C. for 2 h to produce acetic-lauric anhydride, which thereafter was combined with 150 g of high amylose corn starch (having an amylose content of about 75%) to disperse the corn starch. Thereafter, 51.8 g of a catalyst in the form of 35% sodium hydroxide was added. The temperature was increased to 145° C. and the mixture was stirred for 4 h while refluxing. Thereafter, the mixture was cooled to 120° C. and 225 g of acetic anhydride 225 g was added and the mixture was stirred at 130° C. for 1 h.

The obtained viscous liquid was put into water and cured. The cured mass was pulverized in water and pulverization was repeated several times to produce small particles. After washing with water, the product was re-slurried and neutralized from pH 4 to pH 7 with sodium hydroxide. The neutralized product was dehydrated and dried at 80° C. overnight. The dried powder was re-slurried in ethanol, unreacted lauric acid was washed and removed, and the target compound was recovered by suction filtration. This operation was repeated twice to remove lauric acid.

The recovered product was pulverized in water, washed with water, dehydrated, and dried at 80° C. to obtain the desired starch mixed ester composition.

Example 2

High amylose corn starch (having an amylose content of about 75%) was mixed with an amount of acetic anhydride to provide about two moles of acetic anhydride for each mole of water in the high amylose starch. The mixture was stirred for 24 hours to remove the water in the starch. The product was suction-filtered and dried under reduced pressure in a desiccator for 24 hours.

Stearic acid (200 g) and acetic anhydride (200 g) were mixed with stirring at 100° C. for one hour to form a mixed acid anhydride. The mixed acid anhydride was cooled to 60° C. and mixed with the dried high amylose starch, after which a catalyst, DMAP (12 g) dissolved in acetic anhydride (50 g), was added in a dropwise fashion of about 2-3 drops/second.

After completion of the catalyst addition, the temperature was increased to 145° C. and the reaction was carried out with stirring for four hours. Thereafter, the mixture was cooled to 60° C. to permit the addition of additional acetic anhydride (150 g), upon completion of which the temperature was increased back to 145° C. and the reaction continued with stirring for another four hours, at which time the reaction was considered complete.

After completion of the reaction, the temperature was reduced to 60° C., and the viscous reaction product was placed into 60° C. water to cure (solidify) the reaction product, which thereafter was then pulverized, filtered, and dehydrated to obtain the desired starch mixed ester composition.

Example 3

High amylose corn starch (having an amylose content of about 75%) was mixed with NaOH and an amount of acetic anhydride to provide about two moles of acetic anhydride for each mole of water in the high amylose starch. The mixture was stirred for 24 hours to remove the water in the starch.

Stearic acid (100 g) and acetic anhydride (100 g) were mixed with stirring at 100° C. for one hour to form a mixed acid anhydride. High amylose corn starch with acetic anhydride and a 50% aqueous solution of NaOH were heated up to 60° C. and the mixed acid anhydride was added. After completion of the mixed acid anhydride addition, the temperature was increased to 120° C. and the reaction was carried out with stirring for seven hours at which time the reaction was considered complete.

After completion of the reaction, the viscous reaction product was placed into water to cure (solidify) the reaction product, which thereafter was pulverized, filtered, and dehydrated to obtain the desired mixed ester composition. The obtained viscous liquid was put into water and cured. The cured mass was pulverized in water and pulverization was repeated several times to produce small particles. After washing with water, the product was re-slurried with water until the pH reached between about 6 to about 7. The neutralized product was dehydrated and dried at 80° C. overnight. The dried powder was re-slurried in ethanol, unreacted stearic acid was washed and removed, and the target compound was recovered by suction filtration. This operation was repeated twice to remove stearic acid.

Several batches of the starch mixed ester composition were made according to the method described in Example 3 and the glass transition temperature and degree of substitution (DS) was measured. Table 1 shows the results.

TABLE 1

| Sample lot | Catalyst | Glass transition temperature (° C.) | DS of stearate (by NMR) | DS of acetate (by NMR) | DS of total ester (by NMR) | DS of total ester (by titration) |
|---|---|---|---|---|---|---|
| 2022J1 | DMAP | 156.3 | 0.043 | 2.41 | 2.45 | 2.8 |
| 2022J2 | NaOH | 147.1 | 0.043 | 2.56 | 2.60 | 2.7 |
| 230126 | NaOH | 144.2 | 0.026 | 2.29 | 2.32 | 2.2 |
| 230221 | NaOH | 146.0 | | | | 2.0 |
| 230223 | NaOH | 148.7 | | | | 2.3 |
| 230301 | NaOH | 137.8 | | | | 2.4 |
| 230303 | NaOH | 147.2 | | | | 1.8 |
| 230308 | NaOH | 144.7 | | | | 2.0 |
| 230310 | NaOH | 144.2 | | | | 2.2 |
| 230313 | NaOH | 141.0 | | | | 1.9 |

Example 4

The method of Example 3, described above, was repeated except that the stearic acid was replaced with either oleic acid or lauric acid (with the same number of moles as stearic acid). The glass transition temperature and degree of substitution (DS) was measured. Table 2 shows the results.

TABLE 2

| Sample | Catalyst | Glass transition temperature (° C.) | DS of total ester (by titration) |
|---|---|---|---|
| Starch Acetate Oleate | NaOH | 145.5 | 2.8 |
| Starch Acetate Laurate | NaOH | 146.8 | 2.7 |

Example 5

Starch mixed ester compositions were prepared according to the process shown in FIG. 5 and described above. Table 3 presents data relating to the tested conditions and the analysis of the resulting starch mixed ester compositions.

TABLE 3

| | Reaction conditions | | | | | Data Analysis | | | | | |
|---|---|---|---|---|---|---|---|---|---|---|---|
| | | | | | | | | | Total | DS by NMR | |
| No. | Starch | Acid anhydride | Carboxylic acid | Reaction scale (starch g) | Washing process | TGA peak (° C.) | $T_g$ (° C.) | MFR (2.16 kg) | DS by titration (Cal. as DS Ac) | DS Ac | DS ST or DS Ol or DS LA |
| 1 | HACS | $Ac_2O$ | Stearic acid | 100 | Water wash | 204.3/79.3/ 362.5 | 133.12 | 43.7 (190° C.) 6.2 (170° C.) | — | — | — |
| 2 | HACS | $Ac_2O$ | Stearic acid | 100 | Ethanol wash | 359.3 | 143.45 | 10.4 (190° C.) | 2.0 | 2.03 | 0.04 |
| 3 | HACS | $Ac_2O$ | Stearic acid | 3000 | Water wash | 149.7/230.1/ 351.9 | 107.89 | — | — | — | — |
| 4 | HACS | $Ac_2O$ | Stearic acid | 3000 | Ethanol wash | 356.5 | 146.34 | — | 1.87 | 1.80 | 0.06 |
| 5 | Corn starch | $Ac_2O$ | Stearic acid | 100 | Water wash | 190.3/259.9/ 361.3 | — | — | — | — | — |
| 6 | Corn starch | $Ac_2O$ | Stearic acid | 100 | Ethanol wash | 360.8 | 146.21 | — | 1.76 | 1.77 | 0.08 |
| 7 | HACS | $Ac_2O$ | Oleic acid | 100 | Water wash | 278.5/347.0 | N/A | — | — | — | — |
| 8 | HACS | $Ac_2O$ | Oleic acid | 100 | Ethanol wash | 355.0 | 147.9 | — | 1.97 | 2.06 | 0.06 |
| 9 | HACS | $Ac_2O$ | Lauric acid | 100 | Water wash | 291.3/351.1 | 111.1 | — | — | — | — |

TABLE 3-continued

| | | | | | | Data Analysis | | | | | |
|---|---|---|---|---|---|---|---|---|---|---|---|
| | Reaction conditions | | | | | | | | | DS by NMR | |
| | | | | | | | | | Total | | DS |
| No. | Starch | Acid anhydride | Carboxylic acid | Reaction scale (starch g) | Washing process | TGA peak (° C.) | $T_g$ (° C.) | MFR (2.16 kg) | DS by titration (Cal. as DS Ac) | DS Ac | ST or DS Ol or DS LA |
| 10 | HACS | $Ac_2O$ | Lauric acid | 100 | Ethanol wash | 361.8 | 140.9 | — | 2.05 | 2.07 | 0.06 |
| 11 | HACS | $Ac_2O$ | — | 100 | Water wash | 356.1 | 151.6 | — | 2.15 | 1.78 | 0 |

Reaction condition: No. 1-4, 7-11: at 120° C. for 2 H, No. 5-6: at 160° C. for 2 H
HACS: High amylose cornstarch;
ST: Stearate;
OL: Oleate;
LA: Lauric Acid

Example 6

Figure 6A:
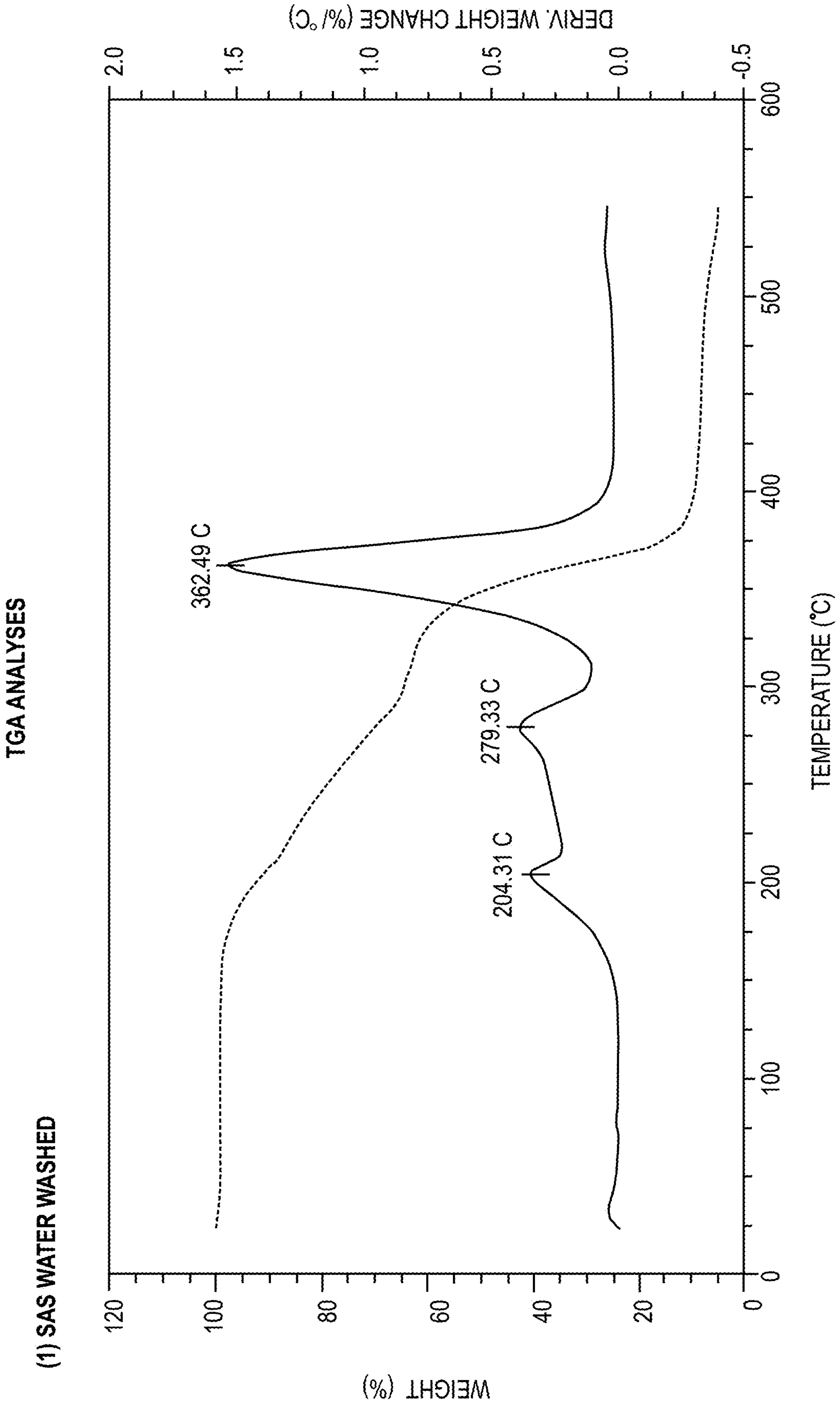
FIG. 6A shows the results of a thermogravimetric analysis (TGA) performed on a sample of a starch acetate stearate that has been made and water washed according to the method shown and described in connection with FIG. 5.
Figure 6B:
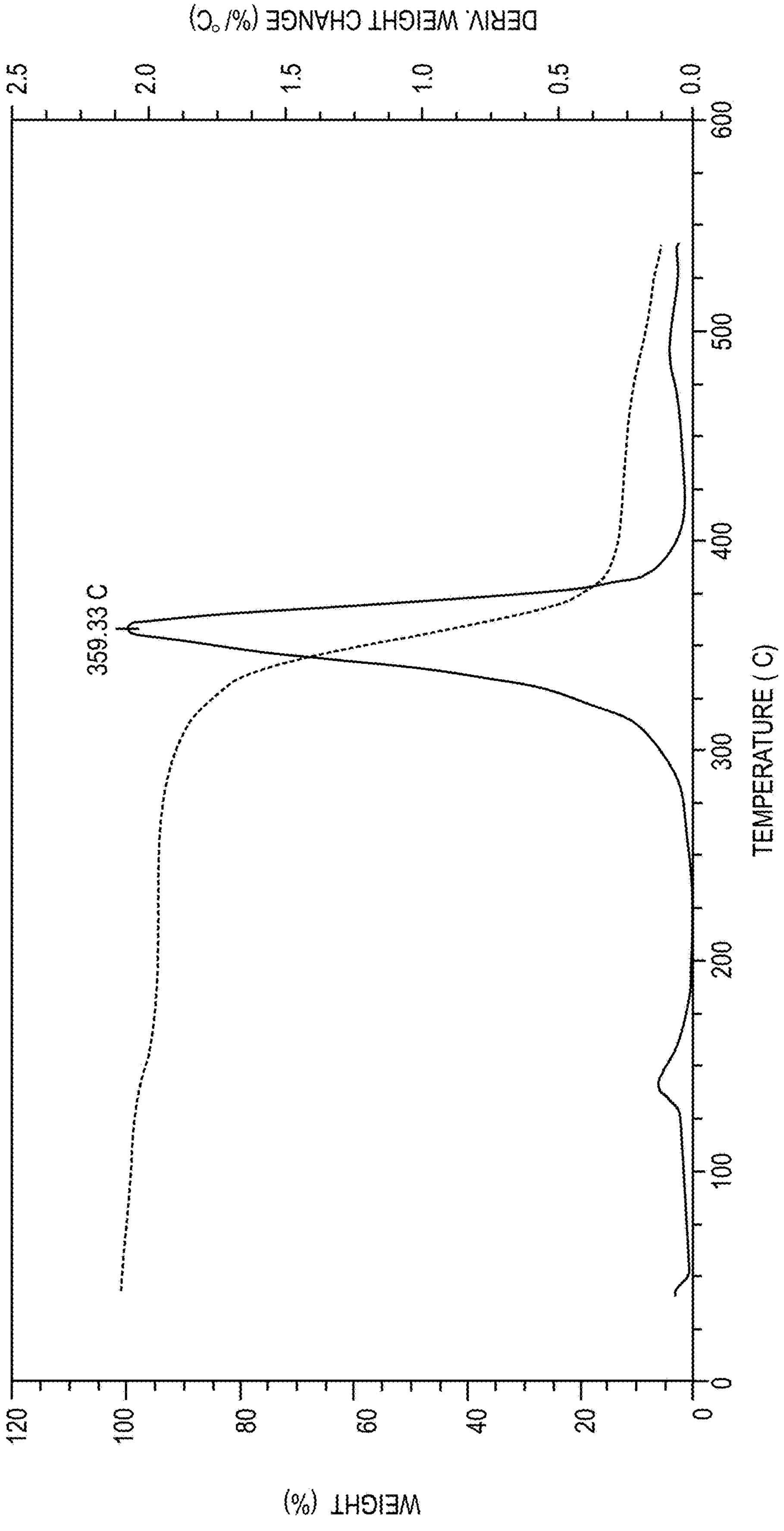
FIG. 6B shows the results of a thermogravimetric analysis (TGA) performed on a sample of a starch acetate stearate that has been made and ethanol washed according to the method shown and described in connection with FIG. 5.
Figure 6C:
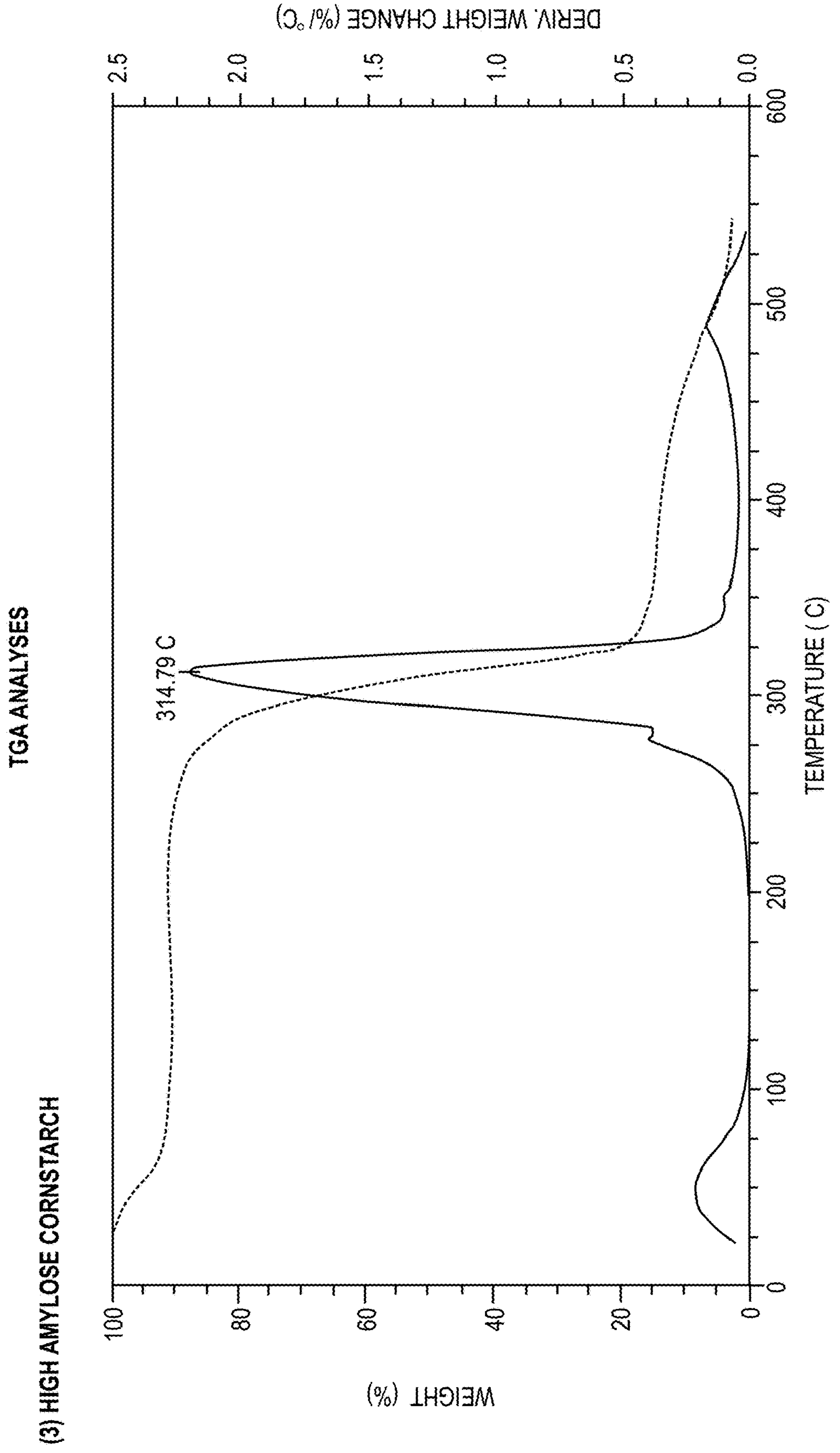
FIG. 6C shows the results of a thermogravimetric analysis (TGA) performed on a sample of a high amylose cornstarch used to make the starch acetate stearate tested in FIGS. 6A and 6B.

Starch mixed ester compositions were prepared according to the process shown in FIG. 5 and described above. Thermogravimetric analyses (TGA) were performed on a sample of a starch acetate stearate that was made according to the method shown and described in connection with FIG. 5. Referring to FIG. 6A, a thermogravimetric analysis (TGA) was performed on a sample of a starch acetate stearate that was made and water washed according to the method shown and described in connection with FIG. 5. FIG. 6B shows the results of a thermogravimetric analysis (TGA) performed on a sample of a starch acetate stearate that was made and ethanol washed according to the method shown and described in connection with FIG. 5. FIG. 6C shows the results of a thermogravimetric analysis (TGA) performed on a sample of a high amylose cornstarch that was used to make the starch acetate stearate tested in FIGS. 6A and 6B.

$^1$H-NMR analyses were performed on a sample of a starch acetate stearate that was made according to the method shown and described in connection with FIG. 5. The samples for NMR (nuclear magnetic resonance) measurements were prepared by dissolving ~30 mg of the sample in 0.7 ml DMSO-$d_6$, and the mixture was transferred to a 5 mm NMR tube using a glass Pasteur pipette. The NMR measurements were performed at 50° C. on a Bruker Advance Spectrometer (500 MHz). The residual DMSO signal was taken as an internal reference in the measurements.

Figure 7A:
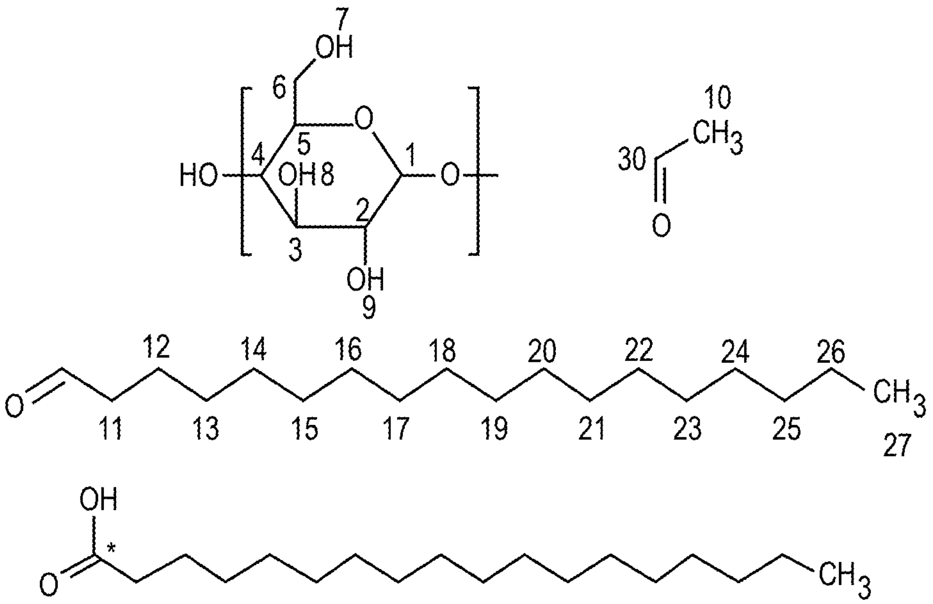
FIG. 7A shows the $^1$H-NMR analysis of a sample of a starch acetate stearate that has been made and water washed according to the method shown and described in connection with FIG. 5.
Figure 7A:
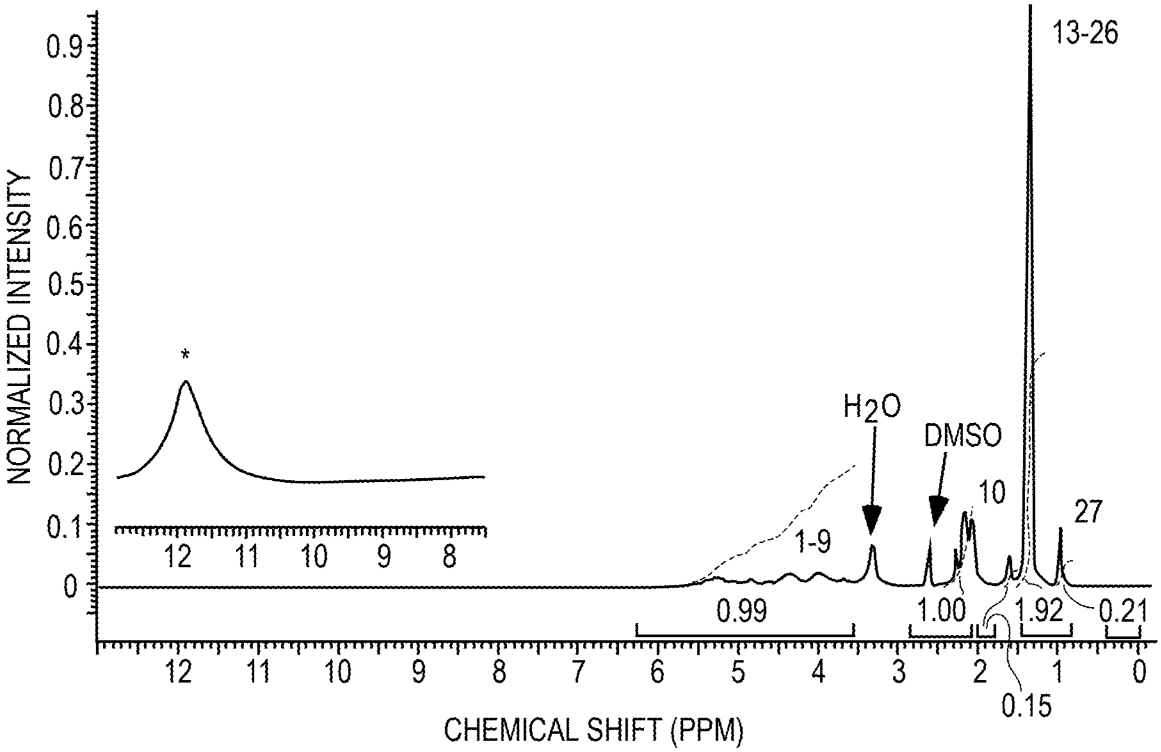

FIG. 7A shows the 1H-NMR analysis of a sample of a starch acetate stearate that was made and water washed according to the method shown and described in connection with FIG. 5. The resonances of the starch backbone, anomeric proton and unsubstituted hydroxyl groups (denoted 1-9) can be observed in the region 3.3-5.9 ppm. The signal corresponding to the methine protons of stearic acid (denoted 13-26) are observed around 1.24 ppm. The signals corresponding to the methyl protons of stearic acid (denoted 27) and acetic anhydride (denoted 10) are observed at 0.84 and in the region 1.8-2.3 ppm, respectively. In addition, there is a broad signal appearing in the region 10.7-12.8 ppm, which corresponds to the carboxylic acid group (denoted *) of stearic acid. This confirms the presence of unreacted stearic acid in the water washed sample.

Figure 7B:
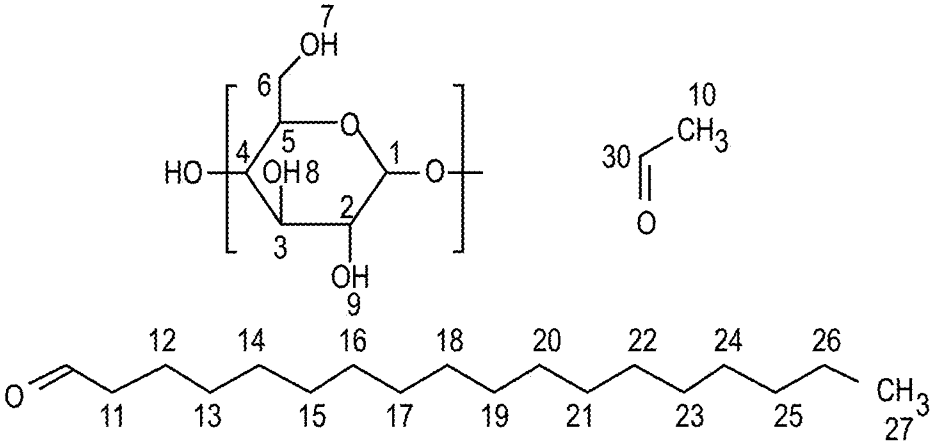
FIG. 7B shows the $^1$H-NMR analysis of a sample of a starch acetate stearate that has been made and ethanol washed according to the method shown and described in connection with FIG. 5.
Figure 7B:
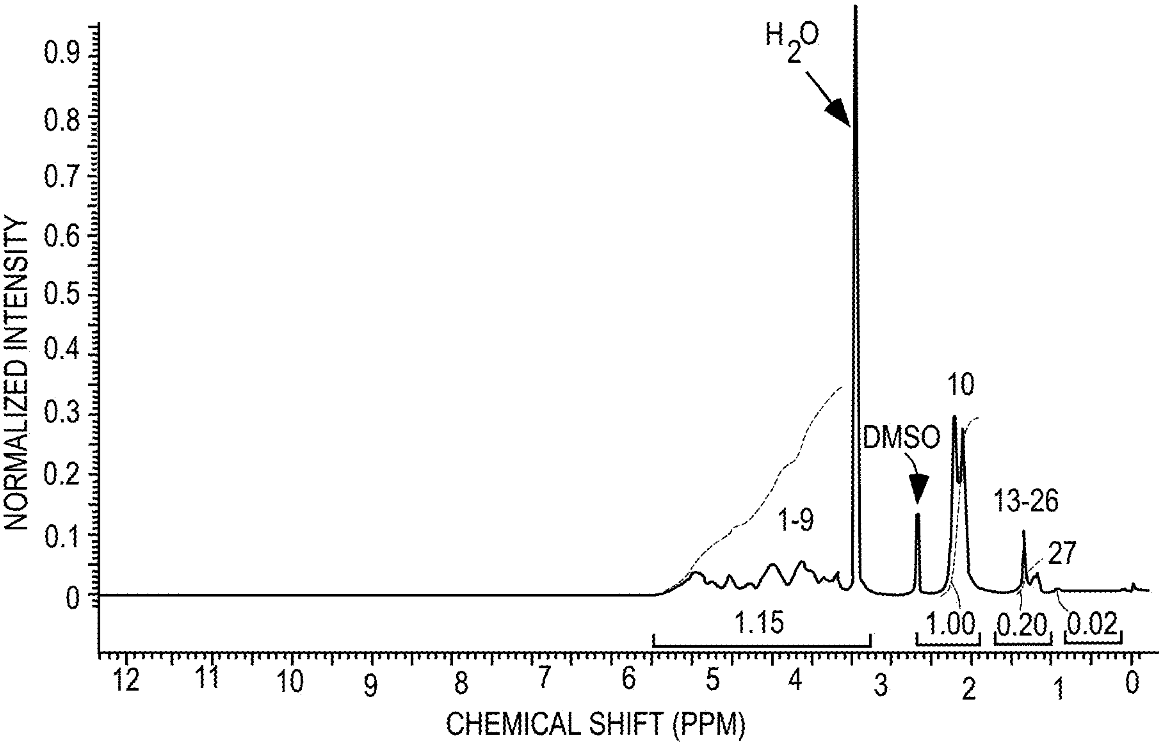

FIG. 7B shows the 1H-NMR analysis of a sample of a starch acetate stearate that was made and ethanol washed according to the method shown and described in connection with FIG. 5. The resonances of the starch backbone, anomeric proton and unsubstituted hydroxyl groups (denoted 1-9) can be observed in the region 3.3-5.9 ppm. The signal corresponding to the methine protons of stearic acid (denoted 13-26) is observed at 1.24 ppm. The signals corresponding to the methyl protons of stearic acid (denoted 27) and acetic anhydride (denoted 10) are observed at 0.84 and in the region 1.8-2.3 ppm, respectively. In addition, the broad signal corresponding to the carboxylic acid group is lost in the ethanol washed sample, which confirms the removal of unreacted stearic acid after ethanol washing of starch acetate stearate.

Figure 7C:
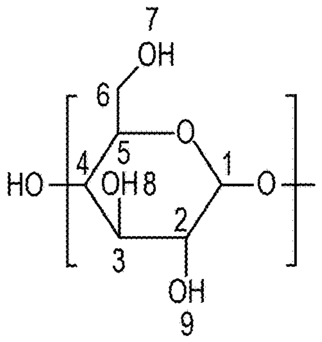
FIG. 7C shows the $^1$H-NMR analysis of a sample of a high amylose cornstarch used to make the starch acetate stearate tested in of FIGS. 7A and 7B.
Figure 7C:
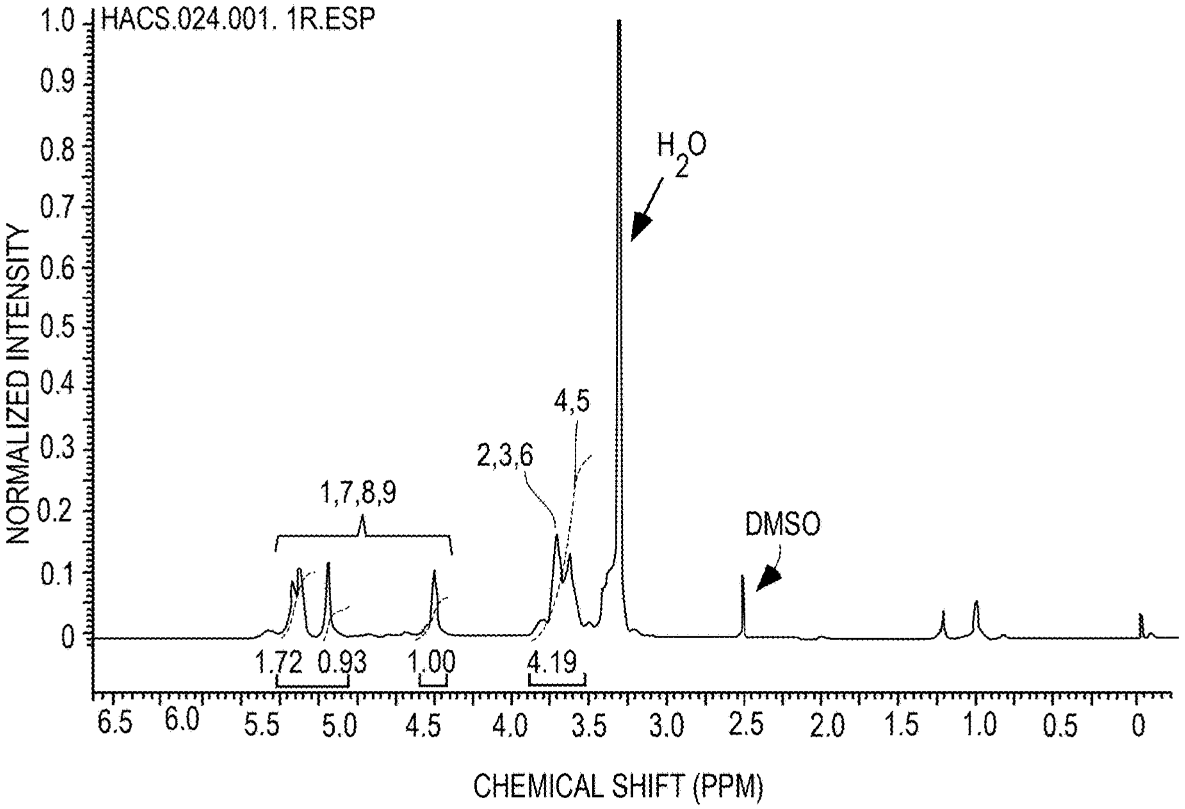

FIG. 7C shows the 1H-NMR analysis of a sample of a high amylose cornstarch used to make the starch acetate stearate tested in of FIGS. 7A and 7B. The resonances of the starch chain protons (denoted 2-6) can be readily identified in the region 3.5-3.9 ppm. The anomeric proton (denoted 1) corresponding to the internal α-1,4 linkages, and the methyl proton corresponding to the OH groups of starch (denoted 7-9) are found in the region 4.25-5.5 ppm. The signal of the residual water peak is present at 3.28 ppm, which appears due to the hygroscopic nature of both starch and DMSO.

$^{13}$C-NMR analyses were performed on a sample of a starch acetate stearate that was made according to the method shown and described in connection with FIG. 5. The samples for NMR (nuclear magnetic resonance) measurements were prepared by dissolving ~30 mg of the sample in 0.7 ml DMSO-$d_6$, and the mixture was transferred to a 5 mm NMR tube using a glass Pasteur pipette. The NMR measurements were performed at 50° C. on a Bruker Advance Spectrometer (500 MHz). The residual DMSO signal was taken as an internal reference in the measurements.

FIG. 8A shows the $^{13}$C-NMR analysis of a sample of a starch acetate stearate that was made and water washed according to the method shown and described in connection with FIG. 5. As observed from the $^{13}$C-NMR spectrum, the signals corresponding to the starch backbone and anomeric carbon are observed in the region 60-98 ppm (denoted 1 and 2-4). The signals attributed to the secondary carbon of the alkyl chain of stearic acid (denoted 11-26) are observed in the region 21.2-34.3 ppm. Further, the signals corresponding to the primary carbon of stearic acid (denoted 27) and acetic anhydride (denoted 10) are observed at 13.7 and 20.2 ppm, respectively. The resonances of carbonyl carbon of the stearic acid (denoted 28) and acetic anhydride (denoted 30)

are observed at 169.1 and 169.8 ppm, respectively. Additionally, the signal at 174.1 ppm is attributed to the carboxylic acid group (denoted *) present in stearic acid, which also confirms the presence of unreacted stearic acid in the water washed sample.

FIG. 8B shows the $^{13}C$-NMR analysis of a sample of a starch acetate stearate that was made and ethanol washed according to the method shown and described in connection with FIG. 5. As observed from the $^{13}C$-NMR spectrum, the signals corresponding to the starch backbone and anomeric carbon are observed in the region 60-98 ppm (denoted 1 and 2-4). The sharp signals attributed to secondary carbons of the alkyl chain of stearic acid (denoted 14-24) are observed around 28.7 ppm. Further, the signals corresponding to the primary carbon of stearic acid (denoted 27) and acetic anhydride (denoted 10) are observed at 13.7 and 20.2 ppm, respectively. The resonances of carbonyl carbon of the stearic acid (denoted 28) and acetic anhydride (denoted 30) are observed at 169.1 and 169.8 ppm, respectively. Additionally, the signal corresponding to the carboxylic acid group of stearic acid is lost, which in turn confirms the removal of unreacted stearic acid upon ethanol washing of starch acetate stearate.

FIG. 8C shows the $^{13}C$-NMR analysis of a sample of a high amylose cornstarch used to make the starch acetate stearate tested in of FIGS. 8A and 8B. As observed from the $^{13}C$-NMR spectrum, the resonances of the starch chain carbons (denoted 2-6) are identified in the region 60-80 ppm. The anomeric carbon (denoted 1) corresponding to the internal α-1,4 linkages is observed around 100 ppm.

Example 8

A blend of starch acetate stearate and PBAT was produced in the following manner. PBAT was fed at a feed rate of 1 kg/hr into a multi-zone Leistritz twin screw extruder operating with a screw speed of about 100 rpm. The extruder had the following temperature profile: 145° C./155° C./180° C./180° C./185° C./185° C./180° C./180° C./160° C./145° C., with a die temperature of 131° C. After feeding the PBAT for a period of time (between about 15 to 20 minutes), feed of a water washed (and dried) starch acetate stearate composition was started at a feed rate of 1 kg/hr. The blend exiting the die, which contained approximately equal parts of the starch acetate stearate and PBAT, was collected and delivered to a water bath with samples being collected after about 7-10 minutes, 10-20 minutes, and 20-25 minutes. Thereafter, the blend was pelletized. Each of the samples were analyzed using thermogravimetric analysis (TGA), derivative thermogravimetric analysis (DTG), and differential scanning calorimetry (DSC) with the results shown in Tables 4 and 5. Thereafter, the blends were pelletized.

Example 9

The blend described in Example 8 was repeated except the feed rate was adjusted to feed the starch acetate stearate composition at about 0.6 kg/hr and the PBAT at about 1.4 kg/hr so that a blend containing about 30% starch acetate stearate and about 70% PBAT was formed. As with Example 8, the blend exiting the die was collected and delivered to a water bath with samples being collected after about 20-30 minutes. Thereafter, the blend was pelletized. The samples were analyzed using thermogravimetric analysis (TGA), derivative thermogravimetric analysis (DTG), and differential scanning calorimetry (DSC) with the results shown in Tables 4 and 5.

TABLE 4

| Sample | TGA weight loss (%) & DTG peak temperature | | | | | |
|---|---|---|---|---|---|---|
| | Peak 1 DTG peak (° C.) | Peak 2 DTG peak (° C.) | Peak 1, 2 Weight change (%) | Peak 3 DTG peak (° C.) | Peak 4 DTG peak (° C.) | Peak 3, 4 Weight change (%) |
| SAS/PBAT 50:50 7-10 min | 210.91 | — | 17.65 | 368.26 | 392.93 | 74.62 |
| SAS/PBAT 50:50 10-20 min | 212.29 | 283.99 | 20.83 | 364.15 | 391.89 | 70.75 |
| SAS/PBAT 50:50 20-25 min | 219.48 | 290.52 | 19.42 | 364.85 | 397.27 | 71.55 |
| SAS/PBAT 30:70 20-30 min | 207.11 | — | 11.08 | 357.44 | 390.59 | 81.38 |
| PBAT | — | — | — | — | 396.89 | — |
| SAS (water wash) | 199.17 | 291.51 | 37.53 | 355.17 | — | 49.47 |
| SAS (Ethanol wash) | — | — | — | 357.29 | — | |
| Stearic acid | 235.96 | — | — | — | — | — |

TABLE 5

| Sample | Tg (° C.) | Tm 1 (° C.) | Tm 2 (° C.) |
|---|---|---|---|
| SAS/PBAT 50:50 7-10 min | — | 69.39 | 127.01 |
| SAS/PBAT 50:50 10-20 min | — | 69.61 | 126.13 |
| SAS/PBAT 50:50 20-25 min | — | 69.53 | 125.55 |
| SAS/PBAT 30:70 20-30 min | — | 68.91 | 129.06 |
| PBAT | — | — | 127.07 |
| SAS (water wash) | 122.62 | — | — |
| SAS (Ethanol wash) | 142.78 | — | — |
| Stearic acid | — | 71.71 | — |

Example 10

A 120 second Cobb test was performed according to ASTM D3285-93 (Standard Test Method for Water Absorptiveness of Nonbibulous Paper and Paperboard) was performed Kraft paper (86 gsm) alone and coated (using a rod coating method) with high amylose corn starch, cornstarch, starch acetate, a water washed starch acetate stearate made according to the method shown and described with respect to FIG. 5, where the starch was a high amylose cornstarch, an ethanol washed starch acetate stearate made according to the method shown and described with respect to FIG. 5, where the starch was a high amylose cornstarch, a water washed starch acetate stearate made according to the method shown and described with respect to FIG. 5, where the starch was a normal (not high amylose) cornstarch, an ethanol washed starch acetate stearate made according to the method shown and described with respect to FIG. 5, where the starch was a normal (not high amylose) cornstarch, and PLA. The PLA coating solution was prepared by mixing the PLA with ethyl acetate to form a 5% (wt/vol) solution of PLA in ethyl acetate. The other coating solutions were prepared by mixing the sample in acetonitrile to form a 5% (wt/vol) solution of sample in acetonitrile.

The results are shown in FIG. 9 and it can be observed that the each of the starch mixed ester biodegradable and/or compostable compositions achieved Cobb values similar to PLA when the coat weight was about 3 to 5 $g/m^2$. In addition, it can be appreciated that there was little to no difference between the Cobb values when comparing the water washed starch mixed ester biodegradable composition with the ethanol starch mixed ester biodegradable and/or compostable composition and when comparing the starch mixed ester biodegradable and/or compostable composition made with high amylose starch and made with normal corn starch.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A method of preparing a biodegradable and/or compostable composition that includes:

preparing a mixed acid anhydride by reacting an acid anhydride and a carboxylic acid having 10 to 24 carbon atoms;

reacting the mixed acid anhydride with starch, in the presence of an esterification catalyst selected from an alkaline metal hydroxide or amino compound, to form a starch mixed ester composition; and mixing the starch mixed ester composition with a biodegradable polymer other than the starch mixed ester composition.

2. The method of claim 1 wherein the acid anhydride is acetic anhydride.

3. The method of claim 2 wherein the carboxylic acid is selected from the group consisting of lauric, stearic, oleic, or mixtures thereof.

4. The method of claim 1 further wherein reacting the starch with the mixed acid anhydride includes;

a. reacting sodium hydroxide, acetic anhydride and starch in a first reactor;

b. reacting acetic anhydride and stearic acid in the presence of the esterification catalyst in a second reactor to form the mixed acid anhydride; and, c. reacting the contents of the first reactor with the contents of the second reactor to esterify the starch and form the starch mixed ester composition.

5. The method of claim 1 wherein the starch is a high amylose content starch.

6. The method of claim 1 further comprising water washing the starch mixed ester composition and thereafter drying to form a water-washed starch mixed ester composition.

7. The method of claim 6 further comprising, subsequent to the water washing, washing the water-washed starch mixed ester with an alcohol to form an alcohol-washed starch mixed ester composition.

8. The method of claim 1 wherein reacting the starch with the mixed acid anhydride includes mixing an acid anhydride, starch, and sodium hydroxide to form a mixture and to dehydrate the starch and, thereafter adding a fatty acid containing from 10 to 24 carbons and additional acid anhydride to the mixture to esterify the starch and to form the starch mixed ester composition.

9. The method of claim 8 wherein the starch is a high amylose content starch.

10. The method of claim 8 further comprising water washing the starch mixed ester composition and thereafter drying to form a water-washed starch mixed ester composition.

11. The method of claim 10 further comprising, subsequent to the water washing, washing the water-washed starch mixed ester with an alcohol to form an alcohol-washed starch mixed ester composition.

12. The method of claim 1 wherein the starch mixed ester composition has a degree of substitution of acetate from about 0.5 to about 2.6 and a degree of substitution of carboxylate from about 0.01 to about 2.4, wherein the total degree of substitution is from about 1.5 to about 2.9.

13. The method of claim 1 wherein the starch mixed ester composition has a glass transition temperature from about 125° C. to about 165° C.

14. The method of claim 1 wherein the biodegradable polymer is selected from the group consisting of polylactide (PLA), poly(hydroxybutyrate) (PHB), polycaprolactone (PCL), polyhydroxy butyrate valerate (PHB-V), poly(β-hydroxyalkanoate) (PHA), Poly(1,4-butylene succinate) (PBS), polybutylene adipate terephthalate (PBAT), poly (vinyl alcohol) (PVA), cellulose-based ester derivatives or a mixture thereof.

15. The method according to claim 14 wherein the biodegradable and/or compostable composition includes from about 20% to about 90% of the starch mixed ester composition and from about 10% to about 80% of the biodegradable polymer.

* * * * *